United States Patent [19]

Clark et al.

[11] Patent Number: 5,164,897
[45] Date of Patent: Nov. 17, 1992

[54] AUTOMATED METHOD FOR SELECTING PERSONNEL MATCHED TO JOB CRITERIA

[75] Inventors: Neil M. Clark, St. Louis Park; Gerald C. Crow, Bloomington; Kent Mueller, Zumbrota; Michael Roloff, Burnsville; Scott Henkel, Bloomington; Allan W. Lehtinen, Plymouth, all of Minn.

[73] Assignee: Techpower, Inc., Minneapolis, Minn.

[21] Appl. No.: 369,650

[22] Filed: Jun. 21, 1989

[51] Int. Cl.⁵ .............................................. G06F 15/21
[52] U.S. Cl. .................................................... 364/401
[58] Field of Search ........................................ 364/401

[56] References Cited

U.S. PATENT DOCUMENTS 4,937,743 6/1990 Rassman et al. ............... 364/401

OTHER PUBLICATIONS

APS Text Search and Retrieval Manual, Planning Research Corp., McLean, VA, 1986 update, pp. 4-2 to 4-26.
Datapro Directory of Software, DataPro Research, Delan, NJ, McGraw-Hill Publications, Dec. 1989, pp. D75-200-001 to D75-200-008.
Data Sources, 1st Edition, vol. 2, 1989, pp. J-280 to J-281.
Data Sources, 1st Edition, vol. 2, 1990, pp. J-256 to J-257.
Job Search software, The Conover Co., Omro, WI, Dialog accession No. 0007423, released 1988.
Skills Inventory software, DynaComp Inc., Webster, NY, Dialog accession No. 01012882.
SearchPro 1.0 software, Direct-Aid Inc., Westlake Village, CA, Dialog accession No. 01012597, released 1986.
Resume Profile System, System Vision Corp., San Francisco, CA, Dialog accession No. 01008439, released 1984.
PRO/SEARCH (Ver. 2.0), North Bay Systems, Sausalito, CA, Dialog accession No. 0023899, released 1989.
Job Budgeting software, CPT Corporation, Minneapolis, MN, Dialog accession No. 0007922, released 1986.

Primary Examiner—Dale M. Shaw
Assistant Examiner—David Huntley
Attorney, Agent, or Firm—Leone & Moffa

[57] ABSTRACT

An automated method for selecting personnel which includes the step of selecting a first set of employees having qualifications matching a first job criteria from a first data file where the first data file includes a first plurality of records and each record includes a first job selection criteria, such as job titles, and a corresponding employee code. A second step comprises selecting a second plurality of employees having qualifications matching a second job criteria from a second data file which includes a second plurality of records wherein each record includes a second job selection criteria, such as industrial experience, and a corresponding employee code. In the preferred embodiment, a third selection is made from yet a third data file including records having a third job selection criteria, such as special skills, with a corresponding employee code. This results in three groups of selected records. The method of the invention then requires selecting the records of those personnel whose employee codes occur at least once in each of the three employee sets.

3 Claims, 21 Drawing Sheets

| TECHPOWER/HI TECH PLACEMENT-SEARCH POWER |
|---|

WELCOME TO THE TECHPOWER MATCH SYSTEM

| ENTER FIRST 3 LETTERS OF YOUR COMPANY |
|---|

TECHPOWER CONFIDENTIAL AND PROPRIETARY

THIS WORK CONTAINS VALUABLE CONFIDENTIAL AND PROPRIETARY INFORMATION. DISCLOSURE, USE, OR REPRODUCTION WITHOUT WRITTEN AUTHORIZATION OF TECHPOWER IS PROHIBITED.

THIS UNPUBLISHED WORK BY TECHPOWER IS PROTECTED BY THE LAWS OF THE UNITED STATES AND OTHER COUNTRIES. IF PUBLICATION OF THE WORK SHOULD OCCUR, THE FOLLOWING NOTICE SHALL APPLY: "COPYRIGHT (c) 1988 TECHPOWER, INC. ALL RIGHTS RESERVED".

*Fig. 2a*

NUMCAPS

| 201a | 201b | 201c |
|---|---|---|
| JOB CLASS SELECTIONS | INDUSTRY SELECTIONS | SPECIAL SELECTIONS |
| ELECTRONIC DIGIT-(71) | COMPUTERS/MICROP-(275) | MOTOROLA-(23)<br>MACINTOSH COMPUT-(13) |
| I OF 3 JOBS USED | I OF 3 INDUSTRIES USED | 2 OF 3 SPECIALS USED |

| MAIN CATEGORIES ——————— FOR EXAMPLE |
|---|
| 1. JOB TITLES ——————— MECHANICAL ENGINEER<br>2. INDUSTRIAL EXPERIENCE ——— FARM EQUIPMENT MFG.<br>3. SPECIAL QUALIFICATIONS ——— IBM CADAM EXP. |
| 9. RUN MATCH (WHEN DONE WITH SELECTIONS) |

ENTER SELECTION     PRESS 'O' FOR EXIT

| DEGREED | | NON-DEGREED ✱ | |
|---|---|---|---|
| 1 ARCHITECT | X | 2 LANDSCAPE ARCHITECT | X |

214

| DEGREED | | NON-DEGREED ✱ | |
|---|---|---|---|
| 1 AERONAUTICAL ENGINEER | X | 2 AERONAUTICAL DESIGN ENGR ✱ | X |

216

| DEGREED | | NON-DEGREED ✱ | |
|---|---|---|---|
| 1 CIVIL ENGINEER | X | 2 CIVIL DESIGN ENGR ✱ | X |
| 3 CIVIL-STRUC ENGINEER GROUP | X | 4 CIVIL-STRUC DESIGN GROUP ✱ | X |
| 5 CONSTRUCTION ENGINEER | X | 6 CONSTRUCTION ENGR ✱ | X |
| 7 STRUCTURAL ENGINEER | X | 8 STRUCTURAL DESIGN ENGR ✱ | X |

217

| DEGREED | | NON-DEGREED ✱ | |
|---|---|---|---|
| 1 ELECTRICAL ENGINEER GROUP | X | 2 ELECTRICAL DESIGN GROUP ✱ | X |
| 3 ELECTRICAL POWER ENGINEER | X | 4 ELECTRICAL POWER DESIGN ENGR | X |
| 5 ELECTRICAL SPECIAL ENGR GROUP | X | 6 ELEC SPECIAL ENGR GROUP ✱ | X |
| 7 ELECTRICAL START-UP ENGINEER | X | 8 ELECTRICAL START-UP ENGR ✱ | X |

(B)

218

| DEGREED | | NON-DEGREED ✱ | |
|---|---|---|---|
| 1 ELECTRONIC ANALOG ENGINEER | X | 2 ANALOG DESIGN ENGR ✱ | X |
| 3 ELECTRONIC COMPONENT ENGINEER | X | 4 ELECTRONIC COMPONENT ENGR ✱ | X |
| 5 ELECTRONIC DIGITAL ENGINEER | 71 | 6 DIGITAL DESIGN ENGR ✱ | X |
| 7 ELECTRONIC LOGIC ENGINEER | X | 8 LOGIC DESIGN ENGR ✱ | X |
| 9 ELECTRONIC MFRG ENGINEER | X | 10 ELECTRONIC MFGR ENGR ✱ | X |
| 11 ELECTRONIC QUALITY ENGINEER | X | 12 ELECTRONIC QUALITY ENGR ✱ | X |
| 13 ELECTRONIC TEST ENGINEER | X | 14 ELECTRONIC TEST ENGR ✱ | X |
| 15 I & C ENGINEER | X | 16 I & C ENGR ✱ | X |
| 17 BSET, BSIT | X | 18 PHYSICIST | X |

| DEGREED | | | NON- DEGREED ✻ | | |
|---|---|---|---|---|---|
| 1 | CONFIGURATION ENGINEER | X | 2 | CONFIGURATION ENGR ✻ | X |
| 3 | COST ESTIMATING ENGINEER | X | 4 | COST ESTIMATING ENGR ✻ | X |
| 5 | FACILITIES PLANNER ENGINEER | X | 6 | FACILITIES PLANNER ENGR ✻ | X |
| 7 | INDUSTRIAL ENGINEER | | 8 | INDUSTRIAL ENGR ✻ | |
| 9 | MANUFACTURING ENGINEER | | 10 | MANUFACTURING ENGR ✻ | |
| 11 | MATERIAL PLANNING ENGINEER | | 12 | MATERIAL PLANNING ENGR ✻ | |
| 13 | N-C PROGRAMMER | | 14 | N C PROGRAMMER ✻ | |
| 15 | PROCESS ENGINEER GROUP | | 16 | PROCESS ENGR GROUP ✻ | |
| 17 | PRODUCTION ENGINEER | | 18 | PRODUCTION ENGR ✻ | |
| 19 | PRODUCTION SCHEDULER | | 20 | PRODUCTION SCHEDULER ✻ | |
| 21 | QA START-UP ENGINEER | | 22 | QA START-UP ENGR ✻ | |
| 23 | QUALITY ENGINEER | | 24 | QUALITY ENGR ✻ | |
| 25 | SAFETY ENGINEER | | 26 | SAFETY ENGR ✻ | |
| 27 | TOOLING PLANNING ENGINEER | | 28 | TOOLING PLANNER ENGR ✻ | X |
| 29 | CONFIGURATION ENGR ✻ | X | | | |

/-222

| DEGREED | | | NON- DEGREED ✻ | | |
|---|---|---|---|---|---|
| 1 | HEAT TRANSFER ENGINEER | X | 2 | HEAT TRANSFER ENGR ✻ | X |
| 3 | MECHANICAL HVAC ENGINEER | X | 4 | HVAC-FACILITIES DESIGN ENGR | X |
| 5 | MECHANICAL START-UP ENGINEER | | 6 | MECHANICAL START-UP ENGR ✻ | |
| 7 | PLANT ENGINEER | | 8 | PLANT ENGR ✻ | |
| 9 | E-M PACKAGING ENGINEER | | 10 | MECHANICAL ENGINEER | |
| 11 | MECHANICAL ENGINEER GROUP | X | 12 | TOOLING ENGINEER | X |

*Fig. 3c*

PROGRAMMER JOB DISCIPLINE SELECTIONS, (D) →

| SELECTION NUMBER | DESCRIPTION |
|---|---|
| 0 | EXIT |
| 1 | BUSINESS |
| 2 | SCIENTIFIC |

| DEGREED | | NON-DEGREED * | |
|---|---|---|---|
| 1  BUSINESS PROGRAMMER | X | 2  BUSINESS PROGRAMMER * | X |

| DEGREED | | NON-DEGREED * | |
|---|---|---|---|
| 1  DATA PROCESSING MANAGER | X | 2  DP BUSINESS MANAGER * | X |
| 3  ELECTRONIC SOFTWARE ENGINEER | X | 4  ELECTRONIC SOFTWARE ENGR * | X |
| 5  PROGRAMMER ANALYST GROUP | X | 6  PROGRAMMER ANALYST GROUP * | X |
| 7  SCIENTIFIC PROGRAMMER | X | 8  SCIENTIFIC PROGRAMMER * | X |
| 9  STATISTICIAN | X | 10  STATISTICIAN * | X |

↓ (F)

| NOT LISTED ABOVE JOB DISCIPLINE SELECTIONS, # 1-18 | | | |
|---|---|---|---|
| 1  CENTRAL OFFICE INSTALLER | X | 2  CENTRAL OFFICE REPAIR | X |
| 3  CENTRAL-OFFICE EQUIPMENT ENG | X | 4  CENTRAL-OFFICE EQUIPMENT ENG | X |
| 5  CENTRAL-OFFICE REPAIR SUPERV | X | 6  DISTRIBUTION ENGINEER | X |
| 7  DISTRIBUTION ENGR * | | 8  EQUIPMENT ENGINEER | |
| 9  EQUIPMENT ENGR * | | 10  FRAME WIRER | |
| 11  GENERAL TELEPHONE EXPERIENCE | | 12  PLANNING ENGINEER-CENTRAL OF | |
| 13  PLANNING ENGR-CENTRAL OFFICE | | 14  PRIVATE BRANCH EXCHANGE INST | |
| 15  PRIVATE BRANCH EXCHANGE REPA | | 16  STATION INSTALLER & REPAIRER | |
| 17  TELEPHONE EXPERIENCE | X | 18  BIOCHEMIST | X |

*Fig. 3e*

DRAFTING JOB DISCIPLINE SELECTIONS *

| SELECTION NUMBER | DESCRIPTION |
|---|---|
| 0 | EXIT |
| 1 | ARCHITECTURAL/FACILITIES |
| 2 | AEROSPACE |
| 3 | CIVIL |
| 4 | ELECTRICAL |
| 5 | ELECTRONIC |
| 6 | INDUSTRIAL/MFRG/PRODUCTION |
| 7 | MECHANICAL/ELEC-MECH/TOOLING |
| 8 | TELEPHONE |
| 9 | NOT LISTED ABOVE |

(E) →

| | | | | |
|---|---|---|---|---|
| 1 | ARCHITECTURAL DESIGNER | X | 2 ARCHITECTURAL DRAFTER | X |
| 3 | HVAC DRAFTER | X | 4 LANDSCAPE DESIGNER | X |
| 5 | LANDSCAPE DRAFTER | X | 6 PIPING DESIGN-DRAFTER | X |
| 7 | PLANT LAYOUT DRAFTER | X | 8 PLUMBING DRAFTER | X |
| 9 | SPRINKLER DESIGN DRAFTER | X | | |

| | | | | |
|---|---|---|---|---|
| 1 | CARTOGRAPHIC DRAFTER | X | 2 CIVIL DRAFTER | X |
| 3 | CIVIL-STRUC DRAFTER GROUP | X | 4 STRUCTURAL DRAFTER | X |

| | | |
|---|---|---|
| 1 | ELECTRICAL DRAFTER | X |

| | | | | |
|---|---|---|---|---|
| 1 | ELEC DRAFTER GROUP | X | 2 ELECTRONIC DRAFTER | X |
| 3 | PRINTED CIRCUIT DESIGNER | X | | |

*Fig. 3f*

| | | | | |
|---|---|---|---|---|
| 1 | CHECKER | X | 2 | DETAIL DRAFTER GROUP | X |
| 3 | E-M PACKAGING DESIGNER | X | 4 | ELECTRO-MECHANICAL DRAFTER | X |
| 5 | LAYOUT DRAFTER GROUP | | 6 | MECHANICAL DESIGNER | |
| 7 | MECHANICAL DESIGNER GROUP | | 8 | MECHANICAL DETAIL DRAFTER | |
| 9 | MECHANICAL LAYOUT DRAFTER | | 10 | TOOLING DESIGNER | X |
| 11 | TOOLING DRAFTER | X | | | |

| | | | | |
|---|---|---|---|---|
| 1 | GRAPHIC DESIGNER | X | 2 | GRAPHIC DESIGNER * | X |
| 3 | INDUSTRIAL DESIGNER | X | 4 | INDUSTRIAL DESIGNER * | X |
| 5 | INTERIOR DESIGNER | X | 6 | INTERIOR DESIGNER * | X |
| 7 | PROPOSAL WRITER | | 8 | PROPOSAL WRITER * | |
| 9 | PURCHASING/BUYER | | 10 | PURCHASING/BUYER * | |
| 11 | SALES ENGINEER | | 12 | SALES ENGR * | |
| 13 | TECHNICAL EDITOR | | 14 | TECHNICAL EDITOR * | |
| 15 | TECHNICAL WRITER | | 16 | TECHNICAL WRITER * | |
| 17 | DRAFTING/CONTROL CLERK | | 18 | COMPUTER OPERATOR * | |
| 19 | TECHNICAL ILLUSTRATOR | X | 20 | INSTRUCTOR * | X |

*Fig. 3g*

```
TECHPOWER MATCH SYSTEM
JOB DISCIPLINE SELECTIONS (0) — EXIT
        (1) — ALL TELEPHONE PEOPLE
        (2) — OSP
        (3) — STATION
        (4) — PBX
        (5) — COE
        (6) — COMPUTER
        (7) — INSTRUCTION

ENTER SELECTION:
```

TELEPHONE SPECIALISTS JOB DISCIPLINE SELECTIONS, # 1-1

|   | TOTAL # AVAIL PEOPLE |   | TOTAL # AVAIL PEOPLE |
|---|---|---|---|
| 1 TELEPHONE EXPERIENCE | 1 | | |

ENTER SELECTION NUMBER:          0 EXIT

TECHPOWER CONFIDENTIAL AND PROPRIETARY

TELEPHONE SPECIALISTS JOB DISCIPLINE SELECTIONS, # 1-8

|   | TOTAL # AVAIL PEOPLE |   | TOTAL # AVAIL PEOPLE |
|---|---|---|---|
| 1 CABLE PLACEMENT TECHNICIAN | 0 | 2 CABLE SPLICER INSTALLATION | 0 |
| 3 CABLE SPLICER REPAIR | 0 | 4 CABLE SPLICER FIBER | 0 |
| 5 CONSTRUCTION SUPERVISOR | 0 | 6 DISTRIBUTION ENGINEER-ASSO | 0 |
| 7 DISTRIBUTION ENGINEER | 0 | 8 DISTRIBUTION ENGINEER-PLAN | 0 |

ENTER SELECTION NUMBER:          0 EXIT

TECHPOWER CONFIDENTIAL AND PROPRIETARY

*Fig. 3i*

TELEPHONE SPECIALISTS JOB DISCIPLINE SELECTIONS, # 1-8

|   | TOTAL # AVAIL PEOPLE |   | TOTAL # AVAIL PEOPLE |
|---|---|---|---|
| 1 REPAIR CLERK | 0 | 2 STATION EQUIPMENT TECH. INSTA | 0 |
| 3 STATION EQUIPMENT TECH.-RE | 0 | 4 STATION KEY EQUIPMENT TECHNI | 0 |
| 5 STATION EQUIPMENT-COIN | 0 | 6 STATION EQUIPMENT-DATA | 0 |
| 7 MOBILE RADIO CELLULAR | 0 | 8 TECHNICIAN CABLE TV | 0 |

ENTER SELECTION NUMBER:          0 EXIT

TECHPOWER CONFIDENTIAL AND PROPRIETARY

TELEPHONE SPECIALISTS JOB DISCIPLINE SELECTIONS, # 1-6

|   | TOTAL # AVAIL PEOPLE |   | TOTAL # AVAIL PEOPLE |
|---|---|---|---|
| 1 PRIVATE BRANCH EXCHANGE-IN | 0 | 2 PRIVATE BRANCH EXCHANGE-RE | 0 |
| 3 PRIVATE BRANCH EXCHANGE-EN | 0 | 4 PRIVATE BRANCH EXCHANGE-SUP | 0 |
| 5 PREMISES SERVICE CONSULTANT | 0 | 6 INSTRUCTOR-PBX | 0 |

ENTER SELECTION NUMBER:          0 EXIT

TECHPOWER CONFIDENTIAL AND PROPRIETARY

*Fig. 3j*

TELEPHONE SPECIALISTS JOB DISCIPLINE SELECTIONS, #1-4

|   | TOTAL # AVAIL PEOPLE |   | TOTAL # AVAIL PEOPLE |
|---|---|---|---|
| 1 COMPUTER-CLERICAL | 0 | 2 COMPUTER-TECHNICIAN | 0 |
| 3 COMPUTER-PROGRAMMER | 0 | 4 COMPUTER SYSTEMS ANALYST | 0 |

ENTER SELECTION NUMBER:     0 EXIT

TECHPOWER CONFIDENTIAL AND PROPRIETARY

TELEPHONE SPECIALISTS JOB DISCIPLINE SELECTIONS, #1-4

|   | TOTAL # AVAIL PEOPLE |   | TOTAL # AVAIL PEOPLE |
|---|---|---|---|
| 1 COMPUTER-CLERICAL | 0 | 2 COMPUTER-TECHNICIAN | 0 |
| 3 COMPUTER-PROGRAMMER | 0 | 4 COMPUTER SYSTEMS ANALYST | 0 |

ENTER SELECTION NUMBER:     0 EXIT

TECHPOWER CONFIDENTIAL AND PROPRIETARY

*Fig. 3k*

TELEPHONE SPECIALISTS JOB DISCIPLINE SELECTIONS, #1-5

|   | TOTAL # AVAIL PEOPLE |   | TOTAL # AVAIL PEOPLE |
|---|---|---|---|
| 1 INSTRUCTOR-NETWORK | 0 | 2 INSTRUCTOR TRAINING DELIVERY | 0 |
| 3 INSTRUCTOR TRAINING DEVELOPE | 0 | 4 TECHNICAL WRITER | 0 |
| 5 MARKETING | 0 | | |

ENTER SELECTION NUMBER:     0 EXIT

TECHPOWER CONFIDENTIAL AND PROPRIETARY

| | | | |
|---|---|---|---|
| 1 ALL INSTRUMENTATION. | X | 2 AUTOMATIC TEST EQUIPMENT | X |
| 3 AVIONICS/TEST SYSTEMS | X | 4 COUNTING & FLOW METERS | X |
| 5 DENTAL EQUIPMENT | | 6 ENVIRONMENTAL-HVAC CONTROLS | |
| 7 INSTRUMENTATION | | 8 MEDICAL INSTRUMENTS | |
| 9 OPTICAL INSTRUMENTS | | 11 ORTHOPEDIC/SURGICAL APPLIANC | |
| 12 PHOTOGRAPHIC EQUIPMENT | X | 13 WATCHES/CLOCKS | X |

(H8) ──▶ 422

| | | | |
|---|---|---|---|
| 1 ALL TRANSPORTATION EQUIP. | X | 2 AIRCRAFT | X |
| 3 AIRCRAFT PARTS | X | 4 AUTOMOBILES | X |
| 5 BUS/TRUCKS | | 6 MISC. VEHICLES | |
| 7 MISSILE PROPULSION | | 8 MISSILES/SPACECRAFT | |
| 9 RAILROAD EQUIPMENT | | 10 SHIPS | |
| 11 TANKS/ARMORED/TRACKED VEHICL | | 12 TRUCK TRAILERS | X |
| 13 VEHICLE PARTS/ACCESSORIES | X | | |

(H7) ──▶ 424

| | | | |
|---|---|---|---|
| 1 ALL ELECTRICAL/ELECTRONICS. | X | 2 BATTERIES | X |
| 3 COMML/LIGHTING FIXTURES | X | 4 COMMUNICATIONS/RF/RADAR | X |
| 5 CONSUMER APPLIANCES | | 6 CONTROLS | |
| 7 ELECTRICAL COMPONENTS | | 8 ELECTRICAL ENCLOSURES | |
| 9 ENGINE ELECTRICAL EQUIPMENT | | 10 MAGNETIC ELECTRONICS/PCB-PWB | |
| 11 MEDICAL ELECTRONICS | | 12 MOTOR/GENERATOR/TURBINES | |
| 13 RESIDENTIAL LIGHTING FIXTURE | | 14 SEMI-CONDUCTORS/I.C.'S | |
| 15 I.C. CIRCUIT HANDLERS/SWITCH | | 16 TELEPHONE EQUIPMENT | X |
| 17 TRANSFORMERS/POWER SUPPLIES | X | | |

(H6) ──▶ 426

| | | | |
|---|---|---|---|
| 1 ALL MACHINERY/COMPUTERS. | X | 2 BLOWERS/FANS | X |
| 3 BUSINESS MACHINES | X | 4 COMML LAUNDRY MACHINES | X |
| 5 COMPRESSORS/NOZZELS/SPRAY | X | 6 COMPUTERS/MICROPROCESSORS | 275 |
| 7 CONSTRUCTION EQUIPMENT | | 8 CONVEYORS/MATERIAL HANDLING | X |
| 9 DIES/MOLDS/FIXTURES | | 10 ELEVATORS | |
| 11 FARM MACHINERY | | 12 FOOD MACHINERY | |
| 13 LAWN MAINTENANCE/SNOW REMOVA | | 14 GEARS/DRIVES/REDUCERS | |
| 15 HOIST,CRANES,MONORAILS | | 16 INDUSTRIAL COMML HVAC EQUIPM | |
| 17 INDUSTRIAL PATTERNS | | 18 INDUSTRIAL PROCESS FURNACES | |
| 19 INDUSTRIAL SERVICE MACHINES | | 20 INDUSTRIAL TRUCKS-STACKERS-L | |
| 21 INTERNAL COMBUSTION ENGINES | | 22 METAL CUTTING TOOLS | |
| 23 METAL FORMING TOOLS | | 24 MINING EQUIPMENT | |
| 25 POWER TRANSMISSION ACCESSORI | | 26 PRINTING MACHINES | |
| 27 PUMPS | | 28 ROLLER/BALL BEARINGS | |
| 29 SCALES/BALANCES | | 30 SPECIAL MACHINES | |
| 31 TEXTILE MACHINERY | | 32 TOOL MEASURING DEVICES | |
| 33 TYPEWRITERS/WORD PROCESSORS | X | 34 VENDING MACHINES | X |
| 35 WEB-PAPER MACHINES | X | 36 WELL SCREENS/DRILLING EQUIPM | X |
| 37 WOODWORKING MACHINERY | O | XIT | |
| ENTER SELECTION NUMBER: | | | |

| | | | | | |
|---|---|---|---|---|---|
| 1 | ALL CAD | X | 2 | ADAGE CAD | X |
| 3 | ALTOS (FRONTIER) CAD | X | 4 | APOLLO CAD | X |
| 5 | APPLICON CAD | X | 6 | AUTOCAD | X |
| 7 | AUTOTROL CAD | | 8 | BELLCAD | |
| 9 | BRUNING CAD | | 10 | CADKEY | |
| 11 | CADNETIX | | 12 | CADVANCE | |
| 13 | CALAY CAD | | 14 | CALCOMP/ISICAD | |
| 15 | CALMA ADVANCE CAD | | 16 | CALMA DAL CAD | |
| 17 | CALMA DDM CAD | | 18 | CALMA GDS I CAD | |
| 19 | CALMA GDS II CAD | | 20 | CASE CAD | |
| 21 | CD2000/DDN ANVIL CAD | | 22 | COMPUTOOL/CAMAX CAD | |
| 23 | CV CADDS I | | 24 | CV CADDS II | |
| 25 | CV CADDS III | | 26 | CV CADDS IV | |
| 27 | CV CADDS IV-X | | 28 | CV CADDS 5-X | |
| 29 | CV MEDUSA CAD | X | 30 | CV/PERSONAL DESIGNER | X |

504

| | | | | | |
|---|---|---|---|---|---|
| 1 | DAISY CAD | X | 2 | DATACAD | X |
| 3 | DEC CAD | X | 4 | DESIGN AIDS CAD | X |
| 5 | DESIGNPRO CAD | X | 6 | EAS CAD | X |
| 7 | ECAD | | 8 | EE DESIGNER CAD | |
| 9 | GEOMOD CAD | | 10 | GERBER CAD | |
| 11 | HEWLETT-PACKARD CAD | | 12 | IBM CADAM | |
| 13 | ICEM/DDN/CD2000 | | 14 | INFINITE GRAPHICS (IGI) CAD | |
| 15 | INTERGRAPH CAD | | 16 | MCAUTO UGII CAD | |
| 17 | MCAUTO/UNIGRAPHICS CAD | | 18 | MENTOR CAD | |
| 19 | MGM (MACINTOSH) CAD | | 20 | MINICAD | |
| 21 | PCAD | | 22 | POINTLINE CAD | |
| 23 | PRIME CAD | | 24 | PROVISION CAD | |
| 25 | REDAC CAD | | 26 | SCI-CARDS CAD | |
| 27 | TEKTRONIX CAD | | 28 | TERAK CAD | |
| 29 | TEXAS INSTRUMENTS CAD | | 30 | VALID SCALD STAR IC CAE | X |
| 31 | VERSACAD | X | | | |

| | | | | | |
|---|---|---|---|---|---|
| 1 | AUTOCAD SYSTEM OWNER | X | 2 | AUTOCAD 2.0 OWNER | X |
| 3 | AUTOCAD 2.15 OWNER | X | 4 | AUTOCAD 2.17 OWNER | X |
| 5 | AUTOCAD 2.18 OWNER | X | 6 | AUTOCAD 2.5 OWNER | X |
| 7 | AUTOCAD 2.52 OWNER | | 8 | AUTOCAD 2.6 OWNER | |
| 9 | AUTOCAD 2.62 OWNER | | 10 | AUTOCAD TRAINING | |
| 11 | AUTOCAD 00-03 MONTHS | | 12 | AUTOCAD 03-12 MONTHS | |
| 13 | AUTOCAD 1 YEAR | | 14 | AUTOCAD EXPERT | |
| 15 | IBM AT(COMP) OWNER | X | 16 | IBM XT(COMP) OWNER | X |

L → 508

| | | | | | |
|---|---|---|---|---|---|
| 1 | CAE | X | 2 | CAM | X |
| 3 | CIM | X | 4 | FINITE ELEMENT ANALYSIS | X |

M → 510

| | | | | | |
|---|---|---|---|---|---|
| 1 | 3M EXPERIENCE | X | 2 | AMHOIST/AMCLYDE EXPERIENCE | X |
| 3 | CDC EXPERIENCE | X | 4 | DONALDSON'S EXPERIENCE | X |
| 5 | ELLERBE EXPERIENCE | X | 6 | FMC EXPERIENCE | X |
| 7 | GENERAL MILLS EXPERIENCE | | 8 | GNB EXPERIENCE | |
| 9 | HONEYWELL EXPERIENCE | | 10 | IBM EXPERIENCE | |
| 11 | MEDTRONIC EXPERIENCE | | 12 | NSP EXPERIENCE | |
| 13 | NW BELL/AT&T EXPERIENCE | | 14 | ONAN EXPERIENCE | |
| 15 | PILLSBURY EXPERIENCE | | 16 | ROSEMOUNT EXPERIENCE | |
| 17 | TECHPOWER EXPERIENCE | | 18 | THERMO KING EXPERIENCE | |
| 19 | TORO EXPERIENCE | | 20 | UNISYS EXPERIENCE | |
| 21 | 3M RETIREE | | 22 | CDC RETIREE | |
| 23 | HONEYWELL RETIREE | | 24 | NW BELL/AT&T RETIREE | X |
| 25 | SPERRY RETIREE | X | | | |

*Fig. 5b*

P ─► ╔═══════════════════════════════════════════════════════════╗ ╔═ 512
```
│  1  4-BIT                      X    2  ANAYK                   X  │
│  3  ANUYK                      X    4  CDC COMPUTERS           X  │
│  5  DEC COMPUTERS              X    6  HEWLETT-PACKARD COMPUTERS X│
│  7  IBM COMPUTERS                   8  IBM PC-XT-AT               │
│  9  INTEL CHIPS                    10  INTEL 8080                 │
│ 11  INTEL 8085                     12  INTEL 8086               X │
│ 13  INTEL 8088                 X   14  MACINTOSH COMPUTER      13 │
│ 15  MOTOROLA                  23   16  MOTOROLA 6800            X │
│ 17  MOTOROLA 68000             X   18  SPERRY-UNIVAC COMPUTERS  X │
```

O ─► ╔═══════════════════════════════════════════════════════════╗ ╔═ 514
```
│  1  ADA                        X    2  C LANGUAGE               X │
│  3  COMPUTER GRAPHICS          X    4  FORTRAN                  X │
│  5  LISP                       X    6  PASCAL                   X │
│  7  REAL-TIME                  X    8  SIMULATION-MODELING      X │
│  9  TACTICS-MISSION            X   10  UNIX                     X │
```

Q ─► ╔═══════════════════════════════════════════════════════════╗ ╔═ 516
```
│  1  ARTIFICIAL INTELLIGENCE    X    2  AUTOMATED ASSEMBLY       X │
│  3  BIPOLAR                    X    4  CALIBRATE                X │
│  5  CLEAN ROOM                 X    6  CPM                      X │
│  7  GEOMETRIC TOLERANCING           8  HEAT TRANSFER              │
│  9  HYDRAULICS                     10  INFRA RED                  │
│ 11  JIT                            12  LASER                      │
│ 13  MIL STDS                       14  NC/CNC                     │
│ 15  NUCLEAR                        16  OPTICS                     │
│ 17  PERT                           18  PLC'S                      │
│ 19  PROFESSIONAL ENGINEER          20  ROBOTICS                   │
│ 21  RUBYLITH                       22  SURFACE MOUNT              │
│ 23  THICK FILM                     24  THIN FILM                  │
│ 25  VSLI                       X   26  WIRE WRAP                X │
```

COPYRIGHT 1988 TECHPOWER, INC.

*Fig. 5c*

TECHPOWER JOB DATABASE STATUS  05/14/89  TECHPOWER COPYRIGHT 1989  PAGE I

| JOB CLASSIFICATION TITLE | NUMBER OF CANDS | BILLING RATE | | |
|---|---|---|---|---|
| | | AVG | HIGH | LOW |
| ARCHITECTRUAL: ALL LEVELS | 25 | 17.72 | 24.00 | 9.00 |
| CAD EXPERIENCE | 117 | 23.91 | 52.50 | 12.00 |
| ELECTRO-MECHANICAL DESIGN-DRAFTERS | 15 | 21.00 | 30.00 | 12.75 |
| ELECTRICAL POWER: ALL LEVELS | 9 | 26.75 | 52.50 | 15.00 |
| ELECTRONIC-PC DRAFTERS & DESIGNERS | 20 | 21.30 | 37.50 | 12.75 |
| ELECTRONIC ENGINEERS & DESIGNERS | 90 | 35.64 | 75.00 | 10.50 |
| HVAC DESIGN: DRAFTERS & ENGINEERS | 10 | 20.70 | 31.50 | 12.75 |
| MECHANICAL DESIGNERS & DRAFTERS | 58 | 28.36 | 52.50 | 16.50 |
| MECHANICAL ENGINEERS | 42 | 34.04 | 75.00 | 10.50 |
| MANUFACTURING-PRODUCTION-IE-ENGINEERS | 78 | 25.31 | 51.00 | 15.00 |
| PLANT LAYOUT-FACILITY PLANNING | 15 | 20.35 | 37.50 | 9.00 |
| PROGRAMMERS/PROGRAMMER-ANALYSTS | 177 | 33.67 | 70.50 | 9.00 |
| STRUCTURAL-CIVIL: ALL LEVELS | 62 | 23.82 | 60.00 | 12.00 |
| TECHNICIANS | 152 | 17.10 | 37.50 | 9.00 |
| TOOLING: ALL LEVELS | 1 | 22.50 | 22.50 | 22.50 |
| ALL DISCIPLINES & LEVELS | 720 | 25.62 | 90.00 | 9.00 |

EVERY 18 MINUTES OUR AVAILABILITY LIST CHANGES !

*Fig. 7*

```
---SEARCH POWER---
```

| PRESENTED TO: | | | | FOR YOUR OPENING: | | | | |
|---|---|---|---|---|---|---|---|---|
| SMITH JOE | | | | | | | ELECT. ENG. | |
| ABC CO. | | | | | | | | |
| C965091 | | | | YOUR REQ. NO. 22222 | | | | |

| EDUCATION CODE: | | | | MATCH CRITERIA: | | | | |
|---|---|---|---|---|---|---|---|---|
| 1. ON THE JOB TRAINING | | 5. B.S. DEGREE | | 1. ELECTRONIC DIGITAL ENGINEER-(71) | | | | |
| 2. TECH SCHOOL TRAINING | | 6. POST GRAD WORK | | 7. MOTOROLA-(23) | | | | |
| 3. TECH SCHOOL GRADUATE | | 7. M.S. DEGREE | | | | | | |
| 4. COLLEGE TRAINING | | 8. PH. D. | | 4. COMPUTERS/MICROPROCESSORS-(275) | | | | |
| | | | | 10. ABC CO. EXPERIENCE-(68) | | | | |

| FILE # | NAME | EXP | EDUC | RATE | 1 | 4 | 7 | 10 | COMMENTS |
|---|---|---|---|---|---|---|---|---|---|
| 10780 | NAME 1 | 14 | 7 | 33.00 | * | * | * | | |
| 15975 | NAME 2 | 30 | 5 | 25.50 | * | * | * | * | |
| 21237 | NAME 3 | 8 | 6 | 45.00 | * | * | * | | |
| 20505 | NAME 4 | 10 | 5 | 52.50 | * | * | * | | |
| 21037 | NAME 5 | 22 | 6 | 45.00 | * | * | * | | |
| 02738 | NAME 6 | 17 | 6 | 25.50 | * | * | * | | |

EVERY____MINUTES OUR AVAILABILITY LIST CHANGES!

*Fig. 6*

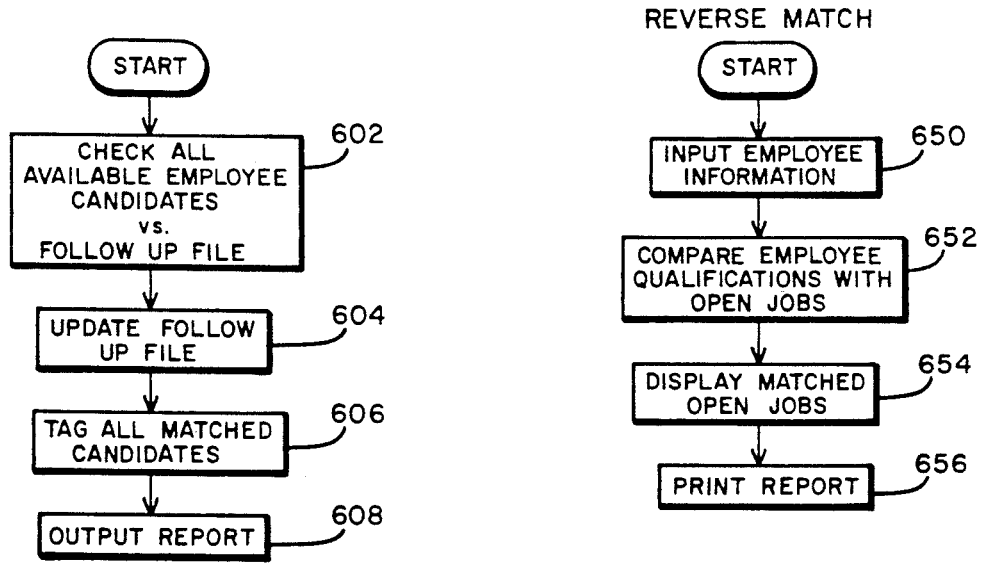

AUTOMATED METHOD FOR SELECTING PERSONNEL MATCHED TO JOB CRITERIA

BACKGROUND OF THE INVENTION

I. Field of the Invention

The invention is directed to an automated method of selecting personnel matched to particular job requirements, and, more particularly, to a method of selecting qualified job candidates for positions defined by specific selection criteria based upon encoded job classification titles, industrial experience and special qualifications.

II. Discussion of the Prior Art

For many years, employment agencies (sometimes called search firms) have been attempting to match job candidates to specific job criteria as required by employers. Most employment agencies receive payment only for those positions which they fill with qualified employee candidates. Therefore, in a highly competitive environment, speed in identifying and presenting candidates and presenting to potential employers is very important. It is also extremely important to be able to handle a large number of potential candidates in various fields in order to be in the best position to fill employers' job requirements as they open.

The most commonly known method of matching personnel to job specification criteria requires a person trained in job placement skills to manually review documents such as resumes and other qualifications related documents while comparing such documents to criteria specified by the potential employer. Such a manual system has several drawbacks. It is obviously very slow in most cases since there is no fast way to sort unqualified candidates from qualified candidates on a large-scale basis. Further, it is believed that an agency using such a system can effectively handle only up to 60 active personnel files per search consultant. This is because much of the information about the candidates must be remembered by the search consultants themselves. Use of such a system makes it difficult to identify and present a list of qualified candidates together with resumes and other needed information to the requestor in less than a matter of several hours.

Some automated systems for selecting personnel based on job criteria do exist. It is believed that such systems are almost exclusively based upon the use of key word searching. That is, qualifications of various personnel are stored in a computer database as, for example, in the form of resumes. The searcher then types in certain key words which relate to the job qualification criteria hoping to match the key words with the job criteria. Such systems are limited by the fact that the use of key Words is very imprecise. This is due to the fact that job titles and, in particular, technological slang terms or "buzz" words have meanings which vary quite extensively from employer to employer and from one region to another. Further, such systems are not "user friendly" because they require significant training and experience with the system before it can be used effectively. Such systems are further limited by misspellings which can commonly occur in large databases and which may cause candidates to be missed by a key word approach. Such systems also require a complete line-by-line search of every file in the system to avoid missing potential candidates.

SUMMARY OF THE INVENTION

The present invention offers advantages and improvements over the prior art because it provides a fast, automated, logically organized, user friendly method for matching the qualifications of job candidates to particular job related criteria as supplied by potential employers. The method of the invention includes the step of selecting a first set of employee records having qualifications matching at least one of the predetermined set of first job criteria from a first data file wherein the first data file includes a first plurality of employee records and each record includes a first job selection criteria code and a corresponding employee code. A second step may be included to select a second set of employee records having qualifications matching at least one of a predetermined set of second job criteria from a second data file which includes a second plurality of employee records wherein each record includes a second job selection criteria code and a corresponding employee code. In the preferred embodiment, a third selection is made from yet a third data file including employee records having a third job selection criteria code and a corresponding employee code. This results in three groups of selected employee records. The method of the invention then requires selecting the records of those employees whose employee codes occur at least once in each of the matched sets.

In the preferred embodiment of the invention, the first database includes job title records wherein each record includes a job title code based upon the Dictionary of Occupational Titles as published by the United States Department of Labor. The second data file is preferably comprised of an industry code based upon the Standard Industrial Classification Manual (herein called SIC codes) as published by the United States Office of Management and Budget and a third data file preferably comprises arbitrary special codes which are related to technical or other parameters such as specific types of machines or computer model numbers. In the preferred embodiment, it is possible to match criteria from all three data files or from any two data files. It is also possible to match job criteria against records held in any one of the data files. The preferred embodiment of the method of the invention is an "English in English out" system wherein lookup tables in the form of dictionaries are provided to translate English words into code and translate code back into English words for eventual display or printout to the user.

In one embodiment of the invention, there is provided a means for printing out all relevant information relating to selected job candidates including resumes, experience, education, criteria matched and other information.

Another feature of the invention provides for identification of matched employees against a company code.

One embodiment of the method of the invention further includes a means for printing out a summary report of all candidates stored in the system according to job title and/or special classifications, number of candidates available and billing rates.

The preferred embodiment of the system offers the capability of inputting more than one qualification criteria to be selected from each database file.

In one embodiment of the invention there is further included a means for restricting certain data for access only by a user employing a security password.

Other objects, features and advantages of the invention will be apparent to those skilled in the art from the description of the preferred embodiment, claims and drawings herein wherein like numerals refer to like elements.

BRIEF DESCRIPTION OF THE DRAWINGS

FIG. 2a shows an introductory screen.

FIG. 2c shows one example of a computer screen main menu configuration after a number of selections have been made by the user.

FIGS. 3a-3l show computer screen menu configurations for the job discipline categories available for selection in one embodiment of the method of the invention.

FIGS. 4a-4c show computer screen menu configurations for the industrial experience categories available for selection in one embodiment of the method of the invention.

FIGS. 5a-5c show computer screen menu configurations for the special categories available for selection in one embodiment of the invention.

FIGS. 6 and 7 show examples of screen configuration of reports generated by one embodiment of the method of the invention.

FIG. 8 is a flow chart of a follow-up computer routine which may be implemented using the method of the invention.

FIG. 9 is a flow chart of a reverse search routine which may be implemented using the method of the invention.

Note that throughout the drawings, the various circled letters show the path which the program will follow upon selecting any of the given selection numbers.

DESCRIPTION OF THE PREFERRED EMBODIMENT

Figure 1A:
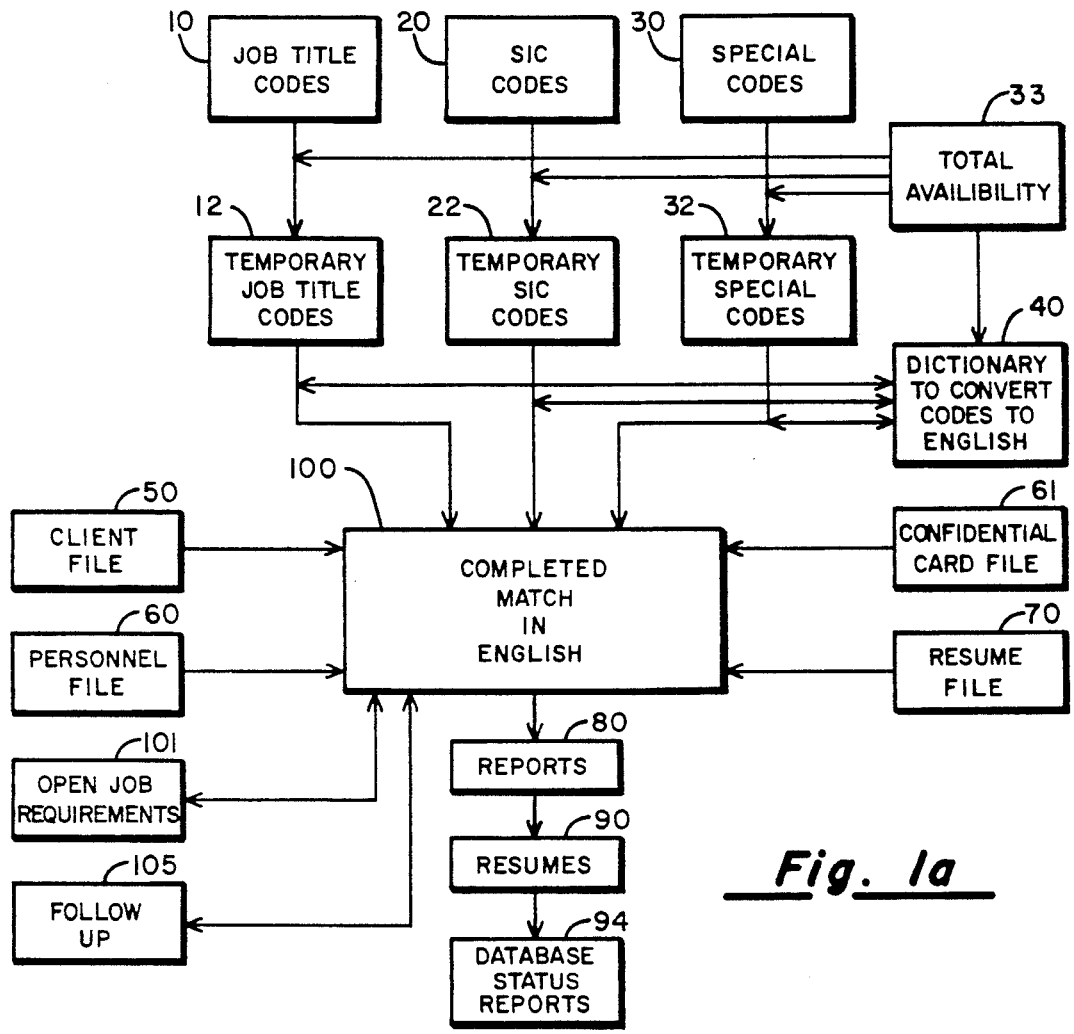
FIG. 1a shows a block diagram of a system embodying the method of the invention.

Referring now to FIG. 1a, a block diagram of a system embodying the method of the invention is shown. For purposes of explaining the invention, the invention will be described as it is embodied in a particular embodiment used for placement of technical personnel. It will be readily understood by those skilled in the art that the invention is not so limited, but may be used to match job criteria in other fields to job candidates having varied qualifications in those other fields. However, it is considered most helpful for understanding of the invention to describe the invention as it relates to a specific example.

As shown in FIG. 1a, the method of the invention generally includes organizing job related criteria into first, second and third data files 10, 20 and 30 respectively. From the first, second and third data files, first, second and third temporary files are created based upon selection criteria supplied by the user. These are shown as temporary job codes 12, temporary SIC codes 22 and temporary special codes 32. In the preferred embodiment, a lookup table in the form of a dictionary 40 is provided to convert codes from numerical data to English language words. Matches with the job criteria are accomplished at block 100 through correlating employee numbers which are common to the first, second and third temporary files. Once the employee numbers have been identified, information from a client file 50, personnel file 60, and resume file 70 may be incorporated at step 100. A computer may then be used to output reports 80, resumes 90 and database status reports 94.

Other files utilized and maintained by the system are a confidential card file 61, open job requirements file 101 and follow-up file 103. The features and uses of these files are explained in detail below.

A utility computer program 33 is included in the preferred embodiment of the invention. Program 33 is preferably run on a daily basis. Its function is to total the number of employees available in each job criteria category and to store the results in the dictionary files This is explained in more detail below.

In the preferred embodiment of the invention, the database files and file matching computer software are implemented to run on a NEC multispeed HD lap top computer using an MS DOS (TM) operating system. One embodiment of the method of the invention has been implemented using FoxBASE+ Revision 2.00 database software which is commercially available from Fox Software, Inc., Perrysburg, Ohio 43551. The software embodying the method of the invention is transportable to other equivalent computers such as personal computers and main frame or mini computers. It is also possible to run the automated selection process of the invention from a remote location via modem. Other programming languages such as C language may also be used to implement the method of the invention.

Figure 1C:
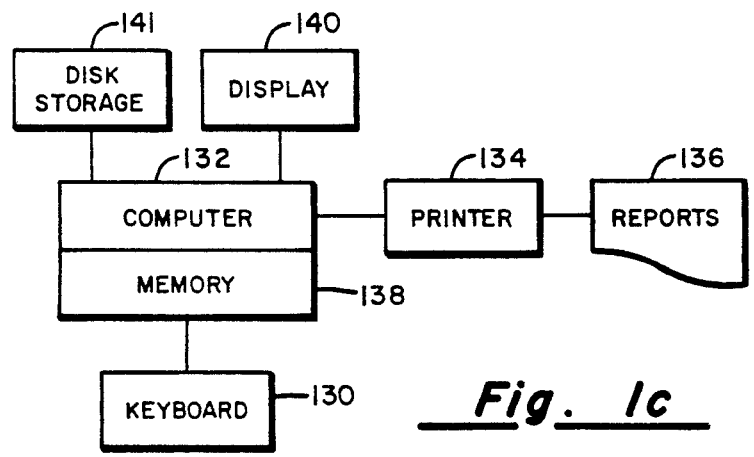
FIG. 1c shows an example of apparatus used for implementing the method of the invention.
Figure 1B:
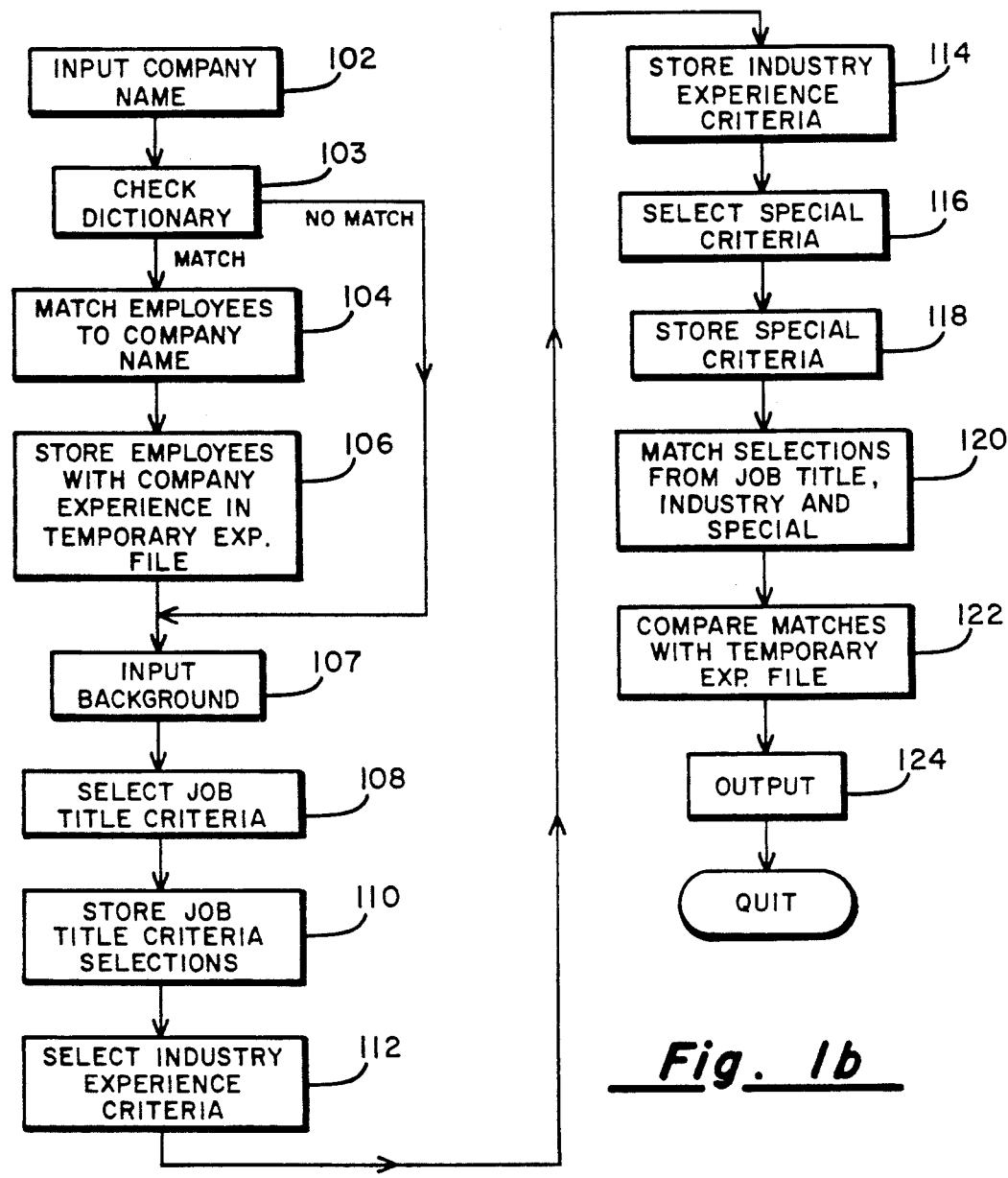
FIG. 1b shows a high level flow chart of the method of the invention.

Referring now to FIG. 1b, a high level flow chart of the method of the invention is shown. FIG. 1c shows a block diagram of typical apparatus which is used to implement the program. Such apparatus preferably includes a keyboard 130, a computer 132 having means for storing information 138, and a printer 134 which outputs reports 136. Also included is a means for display 140 which may be any compatible commercially available CRT tube or flat panel display. As indicated above, all of these components are available commercially and typically the keyboard, computer, disk storage, memory and display are integrated into a single lap top unit such as an NEC HD model computer. In the preferred embodiment of the invention, employee files, dictionary files and the other data files are stored on disk storage. Random Access Memory (RAM) storage is used to hold and execute the program under control of the computer processing unit.

Referring now continuously to FIGS. 1b and 1c, the general operation of the method of the invention will be explained. In general, the user would initiate use of the method of the invention by inputting the first three letter of his company's name from the keyboard in response to a prompt from the computer as shown on display 140. The program then checks the dictionary 40 at step 103 to locate a match for the company in the dictionary database. If no match is found for the company name, the program skips to step 107. If a match for the company name is found, the program would then try to locate a match of the company name to employee employee candidates at step 104. If matched employee candidates are found in the special code database 30, the records of these matched employee candidates would be stored at step 106 in a temporary "experience" file (not shown). At step 107 the user is prompted to supply background information including information such as the job description, number of openings, telephone number, contact name and other information which may be reproduced on the cover sheet of any reports generated by the system in order to identify the search.

The user would then go on at steps 108, 112 and 116 to select job title criteria, industry experience criteria and special criteria, respectively. These selections would then be stored at steps 110, 114 and 118 as shown in FIG. 1b. The selected records are stored in temporary files 12, 22 and 32 as shown in FIG. 1a. At step 120, the program then matches selections from the job title temporary file 12, the temporary SIC code file 22 and the temporary special code file 32. A match is determined to exist for each employee whose employee code is contained in each one of the three temporary code files. This matching is done through a logical command in the FoxBASE (TM) programming language. The match command follows the format below shown in pseudo-code:

(JOB1 .or. JOB2 .or. JOB3) .AND. (SIC1 .or. SIC2 .or. SIC3) .AND. (SP1 .or. SP2 .or. SP3)=MATCH.
Where:
JOB1-JOB3 represent the employee code selection from the job title code file;
SIC1-SIC3 represent the employee code selections from the SIC code file; and
SP1-SP3 represent the employee code selections from the special code file.

Figure 1D:
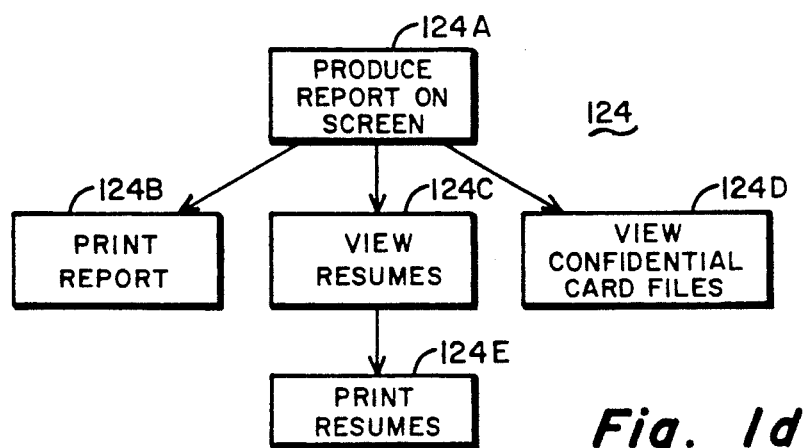
FIG. 1d is a more detailed illustration of system output options.

Once the matched employees are selected at step 120, the preferred embodiment of the program goes on to further identify those employees from the matched set whose employee code also appear in the temporary experience file. At step 124, the matched set is merged with the background information data from the client file 50 and data from the personnel file 60 into an output. FIG. 1d details the types of outputs optionally available using the system of the invention. The system includes means for producing the report on screen 124A, means for printing a search report 124B, means for viewing resumes 124C and/or printing resumes 124E by accessing the resume file 70, and means for viewing the confidential card files 124D. Those skilled in the art will appreciate that any information which is visually displayed on a computer display device may easily be provided as hard copy using a printer. This description is intended to give an overview of the method of the invention. A more detailed explanation follows below.

IV. Job Title Code Data

In the example embodiment of the method of the invention, the job title code data file 10 includes job title codes and corresponding employee code numbers. The employee code numbers are, for example, five digit logical numerical count numbers which are unique to each individual or potential employee for whom data is stored in the system database. There may be several job title codes stored in the job title code data file for each employee code depending on the job experience of the particular employee. The job title codes may be a width of about 9 characters and are preferably based upon the pre-assigned codes as cataloged in the Dictionary of Occupational Titles as published by the United States Department of Labor Employment and Training Administration. While it is possible to create job title codes based upon an independent, logical numbering system, it is preferable in the United States to use the pre-existing codes in the Dictionary of Occupational Titles. Modifications to these codes may be made as deemed appropriate by the user of the automated method of the invention.

The codes found in the Dictionary of Occupational Titles allow for a structured and logical search since the codes are organized from left to right to identify very broad occupational titles with the left most digits. More specific job descriptions are identified with the right most digits. This enables searching of very broad categories based upon a right hand side truncated job title code, or a more particular job title based upon a full 9 digit occupational title code. An example of some of the occupational title codes or job title codes as used by one example of the method of the invention is shown in the Appendix hereto.

Use of these codes to select personnel which match desired job criteria is also explained further in detail below. The commercial software used in implementing one embodiment of the invention also supplies a sequential record number which identifies each record in the file. A partial list of a job title code file as used in one embodiment of the invention is shown in Table 1 below.

TABLE 1

| FN010 | Code |
|---|---|
| 09079 | 001061010 |
| 02261 | 001061010 |
| 21025 | 001061010 |
| 17730 | 001061010 |
| 14799 | 001161010 |
| 21399 | 001161010 |
| 21823 | 001161010 |
| 22000 | 001161010 |
| 17384 | 001261010 |
| 20347 | 001261010 |

In one embodiment of the invention, Table 1 includes about 1720 data records of the type shown above in Table 1.

V. SIC Codes

The second data file used in the example embodiment of the method of the invention includes a plurality of records each having an SIC code and a corresponding employee number. As is the case with the job title codes, one employee number may correspond to more than one SIC code depending upon the experience of the particular employee. Also, as in the case of the job title codes, the records are sequentially numbered by the commercial software. The SIC code is based upon the codes in the Standard Industrial Classification Manual as published by the United States Executive Office of the President, Office of Management and Budget. As in the case of the Dictionary of Occupational Titles, the SIC codes are organized logically with the left hand most digits referring to broad industrial classes and the right hand most digits referring progressively to more narrow industrial classifications. In this way, the system employing the method of the invention may search industry classifications broadly or narrowly as explained further in detail below. SIC codes may be modified as desired to customize the searching process. An example of some of the SIC codes and corresponding industry classifications are shown in the Appendix hereto.

In one embodiment of the invention, the SIC code data file contained about 2756 files. In the preferred embodiment, the employee code may have a width of about 5 characters while the SIC code may have a width of about 4 to 8 characters. One example of some records contained in the example embodiment of the method of the invention are shown below in Table 2.

TABLE 2

| FN010 | Code |
| --- | --- |
| 18258 | 1011 |
| 10379 | 1521 |
| 14799 | 1521 |
| 19067 | 1521 |
| 09079 | 1521 |
| 02621 | 1521 |
| 21002 | 1521 |
| 10978 | 1521 |
| 17730 | 1521 |
| 21322 | 1521 |

VI. Special Codes

In the example embodiment, a special code data file is used as a third selection criteria. As in the case of a job title code file and the SIC code file, the special code file includes a plurality of records having sequential record numbers as assigned by the commercial program used, special codes as assigned by the user of the system and employee codes corresponding to each special code record. The employee codes are as explained above and, as in the other files, there may be more than one special code corresponding to a single employee. The assignment of the special codes is left to the ingenuity of the programmer. A sampling of special codes used in the example embodiment of the invention is shown below in the Appendix hereto. The special codes can be used to "customize" a search by providing criteria referring to a specific company or a specific model number machine or computer, for example. Special codes used in this example are two alphanumeric characters in width although the data file in this example allows for a width of 4 characters if needed. Some sample records contained in the example embodiment of the invention are shown below in Table 3.

TABLE 3

| FN010 | Code |
| --- | --- |
| 03766 | 01 |
| 21723 | 01 |
| 02921 | 02 |
| 19067 | 02 |
| 06888 | 03 |
| 18443 | 04 |
| 04920 | 04 |
| 03713 | 05 |
| 04908 | 05 |
| 07239 | 05 |

The use of the special code file for matching personnel to particular job criteria is explained further in detail below.

VII. Temporary Databases

The job title code data file 10, SIC code data file 20, and special code data file 30 contained coded data from available personnel candidates. The method of the invention allows a use to select several skills and qualifications a successful candidate must possess to fill a job requisition. Those with that skill will be extracted from the above databases and stored in the temporary databases 12, 22, and 32, which will contain Only selected personnel. These temporary databases are smaller and more manageable than the above databases, thus producing a more efficient match for the user. (The actual selection process employed by the method of the invention is explained further in detail below in the section labeled Operation of the Invention.) It follows, therefore, that the temporary job title code data file 12 is a subset of the larger job title code file 10. Similarly, the temporary SIC code data file 22 is a subset of the SIC code data file 20, and the temporary special code data file 32 is a subset of the special code data file 30. The length of the temporary files varies and is a function of the breadth of the search being conducted, the number of matches found and other factors.

VIII. Dictionary

The dictionary 40 employed by the example embodiment of the invention provides a lookup table for converting the job title codes, SIC codes and special codes from code numbers to English words. In the preferred embodiment of the invention, the dictionary is divided into three database files, each corresponding to one of the code types. In the example embodiment of the invention, the dictionary is divided into a first file for job title codes, a second file for SIC codes and a third file for special codes. The use of the numerical codes is transparent to the user who is only required to use English words in utilizing the system.

Each of the three dictionary files is organized into several fields. The dictionary file which provides the English to job code conversion for the job title codes file comprises six fields in the example embodiment. One example of a dictionary job code file is shown in Appendix Table VIII-1. As can be seen from reference to Appendix Table VIII-1, the fields comprise a record number field, a description field (DESCRIPT) having a width of about 35, a CODE field having a width of 9 characters corresponding to the 9 character job title codes, a 1 field wide sorting field labeled "I", a 5 column wide availability count field, CNT1, and a menu sorting field MKY having a width of about 8 characters. The record numbers are assigned by the FoxBASE program. The descriptions in the DESCRIPT field are descriptions as typically found in the Dictionary of Occupational Titles. Similarly, the codes are as found in the Dictionary of Occupational Titles corresponding to the English description. The "I" field is used by utility programs other than the searching program which comprises a method of the invention. For example, the "E" in the "I" field represents ENGINEER, "P" may represent PROGRAMMER, "D" may represent DRAFTSMAN, "T" may represent TECHNICIAN, and other codes may be used as desired by the user. The CNT1 field contains the availability count as stored there through the operation of computer program 33, TOTAL AVAILABILITY, which is the utility program used for totalling all personnel available in the system against SIC codes, job title codes and special codes. The MKY field is a nine digit field used to conveniently group types of job titles so that the program can quickly display menus as selections are made during operation of the program.

Further in explanation of the MKY field by example, the MKY code 1010001 is used by the program incorporating the invention to organize and display menu number 212 as shown in FIG. 3b in the following manner. The left hand most digit being a "1" corresponds to the number "1" selection from menu 202 in the general job discipline of ENGINEER. The third left hand most digit, in this case being a "1", corresponds to the selection ARCHITECTURAL/FACILITIES on menu 208. In this example, the program will bring up onto the menu all of the job titles out of the dictionary which have MKY codes with the first three left hand digits matching "101". The right hand most digits are used by the program to order and provide selection numbers for the English job titles which appear on the menu, as for example in menu 212. A further example of how this MKY field is used can be seen with reference to menu 214 which is sorted on the first three digits "102" for the AEROSPACE job discipline.

In the preferred embodiment of the invention, a second dictionary file corresponding to the SIC codes is used in a manner similar to the job title dictionary described above. A listing of the SIC code dictionary as used in one example embodiment of the invention is shown in Appendix Table VIII-2. As can be seen with reference to Appendix Table VIII-2, the SIC dictionary also comprises a record field, a description field, a code field, a CNT1 field, and an MKY field. The record number is assigned by the FoxBASE system. The descriptions are descriptions corresponding to the SIC manual. The codes correspond to SIC codes as found in the SIC manual. Other codes and descriptions may be included in this field as a matter of design choice. The CNT1 or count field represents the number of available employees for each of the SIC codes. As with the job title dictionary, the number available is determined by the utility program 33. The MKY code is used as above to generate menu displays.

The third dictionary used in the preferred embodiment of the invention is a dictionary comprised of special codes. These codes may be generated by the user for the purpose of describing areas of expertise which are particularly useful in the job field being services. As with the above two dictionaries, the special dictionary includes a record number, description, code number, availability count CNT1, and an MKY field. Reference to Appendix Table VIII-3 shows the contents used in the example embodiment of the invention. The special dictionary has field widths identical to the SIC code dictionary.

IX. Client File

The client file 50 may optionally be included in the system and may contain information pertaining to the employment agency's clients, that is, employers who are searching for candidates to fit into particular job openings. The client file may contain information such as the name of a client, the client's address, the name of the client contact, telephone numbers, client preferences (for example for former employees or retirees), and other relevant information. This information is used in putting the proper headings on reports and may be used for searching preferential candidates as explained more in detail below.

One embodiment of the invention has incorporated the client name with a corresponding special code in the special code dictionary and does not include a separate client file.

X. Personnel File

The personnel file 60 includes information on all candidates in the system including name, phone numbers, address information, billing rates, and other pertinent information. As in the case of the client file 50, the personnel file 60 supplies information useful in printing reports. The personnel file further includes the employee code numbers so that the selected employee code numbers may be matched to the named individuals having a password file. The personnel file may also preferably include a transfer code which is used to periodically update the system files. On a periodic basis, those employees who have become unavailable for employment may be tagged by the transfer code for transfer from the on-line, active files to a larger, permanent storage file which is preferably off line. This transferring includes the transfer of all records related to the unavailable employee code. The transfer operation is carried out by a utility program wherein a user changes the transfer code for each employee in the personnel file as required. The actual transfer of records is implemented as a batch mode operation which sorts on the transfer code. It is also advantageous to store the employees "next available date" in the personnel file. This date can be periodically checked in order to generate reminder notices sufficiently in advance of the availability date to allow for preparation and updating of files to be returned to the active or available status from the permanent file.

While it is one object of the invention to provide a method which may be used by customers as well as employment agency or search firm personnel, the owner of the database and software employing the method of the invention may desire to keep certain information confidential and deny access to that information except to authorized personnel. In the example embodiment of the invention, a password file called CARD FILE 61 is included which may be accessed only through the use of a restricted security code. The password file may include information such as unlisted phone numbers, wage demands, last contact date, messages and other confidential information about specific employees. These files also use the employee code for identification purposes and are part of the Personnel File 60. The last contact date is advantageously tracked by the system to flag employee candidates who have not been contacted within a predetermined time period. The system flags these candidates for follow-up calls. Candidates whose last contact date is earlier than a predetermined cutoff date are transferred to the permanent file.

OPERATION OF THE INVENTION

Having described in detail the various features embodying the invention, attention will now be directed to operation of the method of the invention as used in a typical environment.

Referring to FIG. 2a, the first screen of the example program is shown. The user responds to the instructions shown by entering the first three letters of the user's company. The program uses this code to check the special code dictionary as shown in Appendix Table VIII-3 for availability of employees having experience with that company. In normal use, only larger companies or companies which are frequent clients of the agency using the system on the invention will be listed in the special code dictionary. Examples of such companies can be seen in Appendix Table VIII-3 listed under MKY code 2500001 to 25000027. If there is a match to the company code in the special dictionary, the program proceeds to store in a temporary file (not shown) all of the employee codes which match the company code out of the special code file 30. This temporary file is kept active until the matching between the 3 temporary files 12, 22 and 32 is completed. After the matches have been found from files 12, 22 and 32, the temporary file containing the employees with company experience is scanned by the program to identify those employees who have been found as matches from the three temporary databases so that they can be identified as having prior company experience on the file report.

Figure 2B:
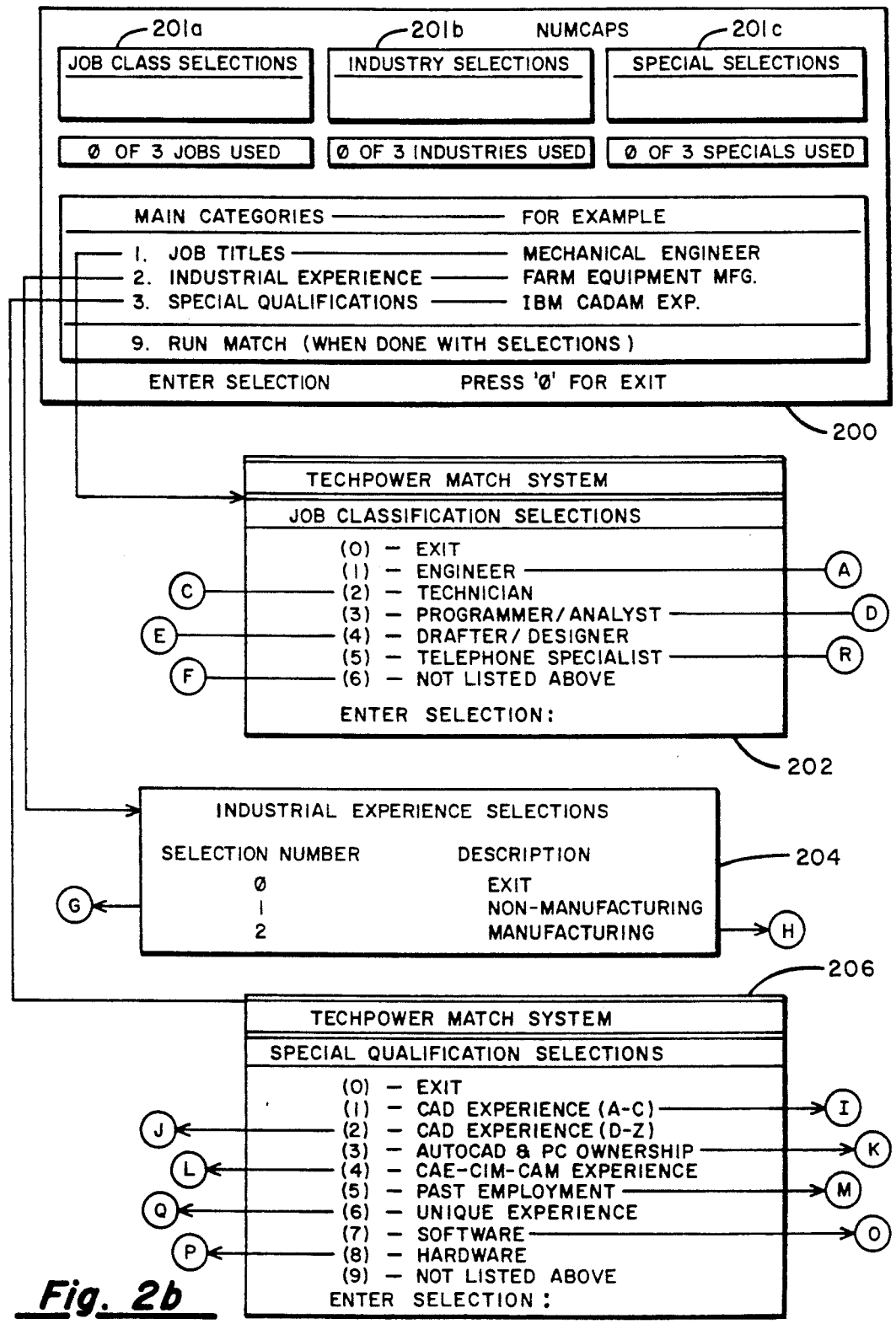
FIG. 2b shows a block diagram of a sample main selection screen and the major selection category branches employed by one example of an embodiment of the invention.

Referring now to FIG. 2b, four of the higher level menus employed by the method of the invention are shown. These are the main menu 200, job title menu 202, industrial experience selections 204, and special qualification selections menu 206. Generally, when using the selection system of the invention, the user progresses through a series of such menus selecting the categories which he or she desires to see put up on the computer screen by entering the numerical selection code specified on the menu from a computer keyboard. For example, if the screen is displaying the main category menu 200 and the user wishes to view the information in the job title files the user would enter the number "1" from the keyboard. Selection number "1" from the main categories menu will cause the software program to pull up and display menu 202. In a like manner, selection number "2" from the main menu 200 will pull up menu 204, industrial experience selections, and selection number "3" from the main menu 200 will pull up menu 206, special qualification selections.

As can be seen in FIG. 2b, the main menu includes boxes entitled JOB CLASS SELECTIONS 201a, INDUSTRY SELECTIONS 201b, AND SPECIAL SELECTIONS 201c. These boxes are filled in by the program as the user makes his selections within those three categories. In the example embodiment of the method of the invention, three selections are allowed within each category. These selections may all be made upon entering any one of the three categories or may be selected by multiple entries to the categories from the main category menu 200. Although the example herein limits the number of selections within any category to 3, this number may be expanded or limited depending upon the particular application through programming means well known in the art. It should be pointed out further that the method of the invention does not require that the categories be entered in any particular order. It is also possible to make a selection of personnel through entering any one, two or three of the main category selections. It is not necessary to enter a selection from each category in order for the program to match the personnel to the job requirements.

Figure 3A:
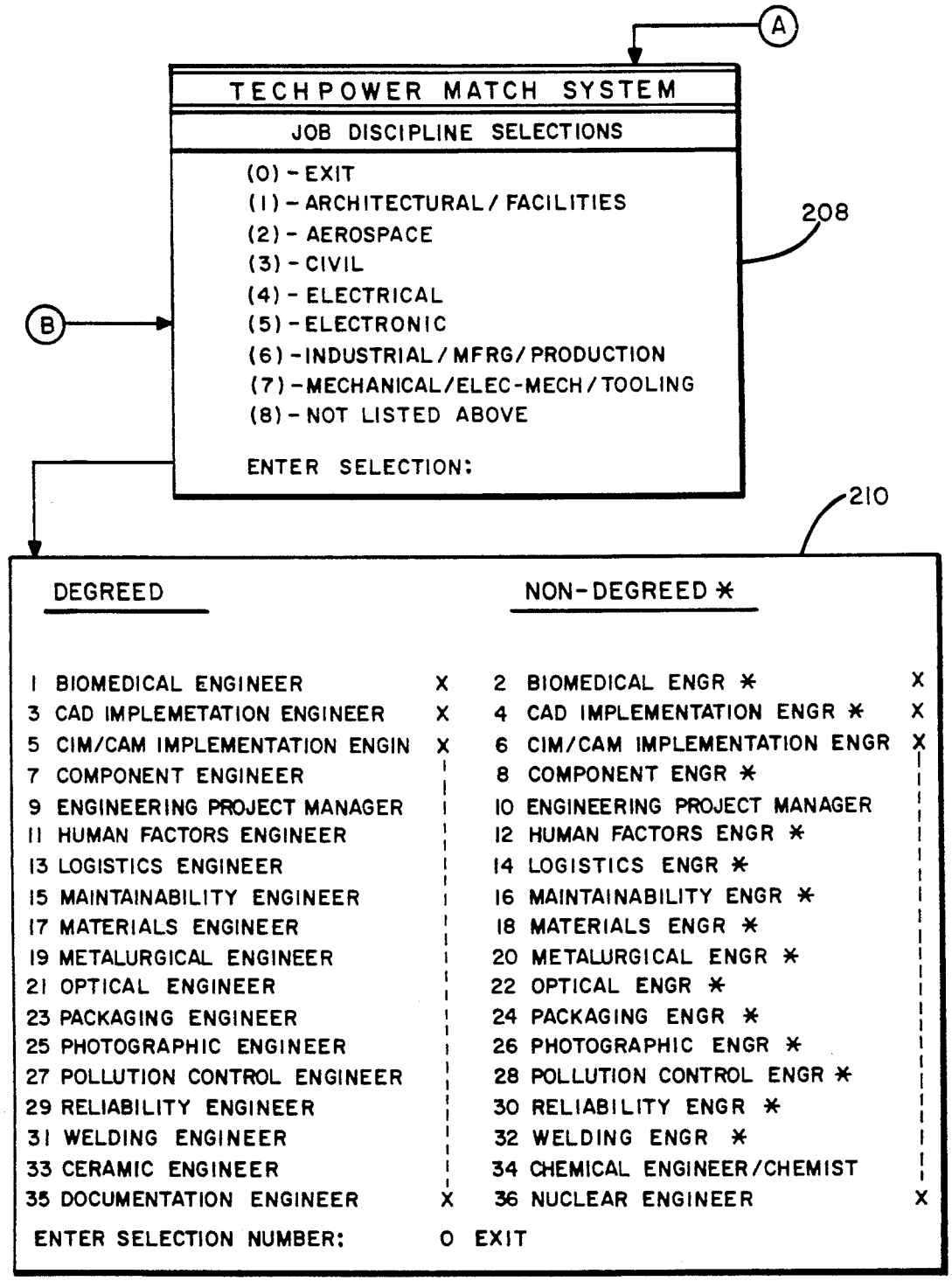
Figure 3D:
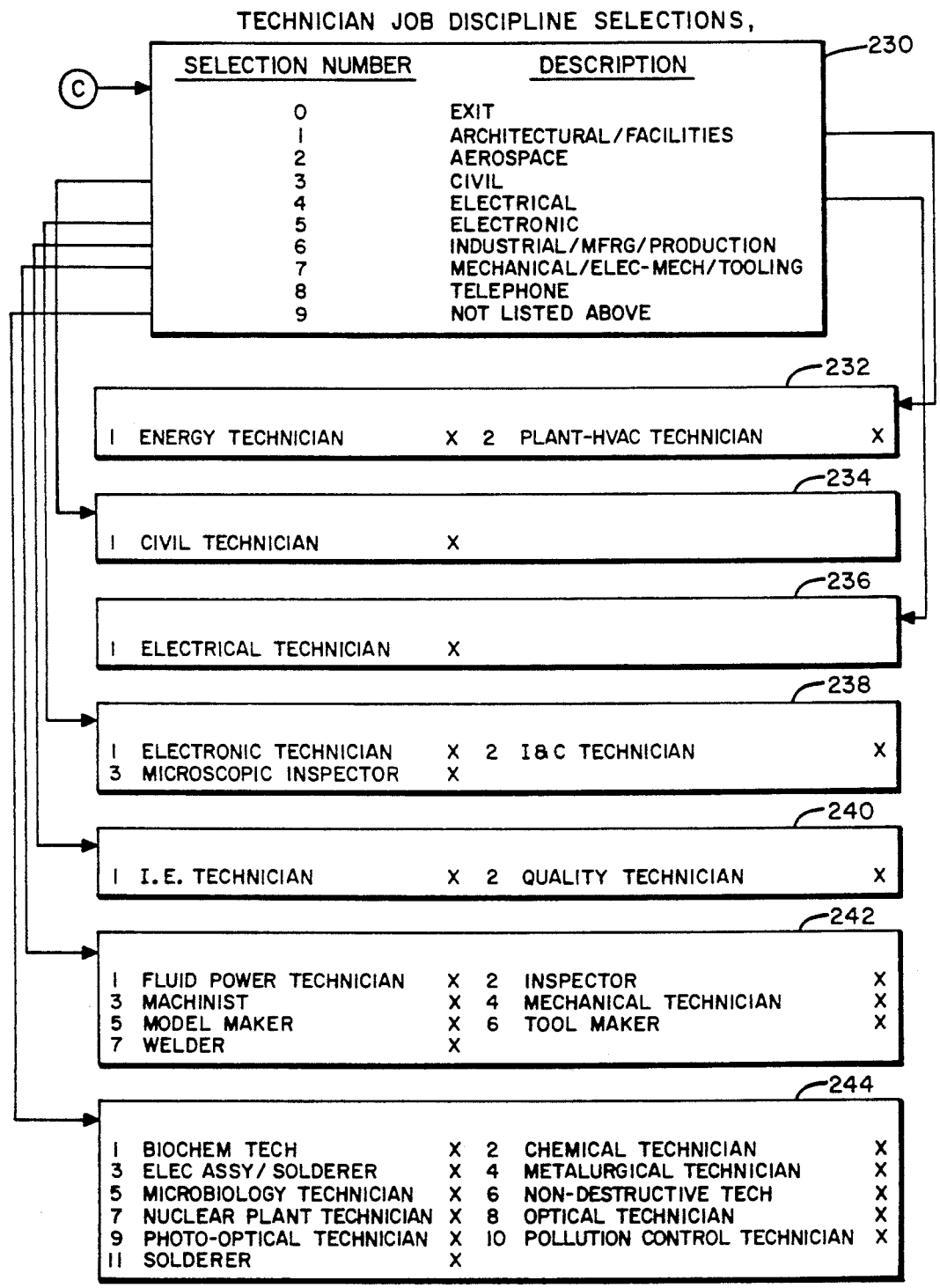

To continue with an example of the operation of the invention, assume that a user selects "1" JOB TITLES as the first selection from the main menu. The program will then display menu 202 having a list of job titles each having a selection number. In the example embodiment of the invention, the job title menu 202 is programmed into the software as a fixed format display. Assuming that the user then selects selection number "1" from menu 202, which is described as ENGINEER, the system will proceed to the engineering job discipline selections as shown in FIG. 3a. Following this same example and now referring to FIG. 3a, menu 208, which is also a fixed format menu, will be displayed on the screen. The user would then select a field of engineering which is desirable depending upon the job criteria the user desires to match. If, for example, the user was interested in electronic engineers, he would input selection number "5" from the keyboard. Referring now to FIG. 3b, after selection number "5" from menu 208, the system would display menu number 218 which is created through the selection of all job titles encoded under electronic engineers as defined in the Dictionary Lookup Table file for job titles. That is, all job titles under MKY codes 1050001-1050018 will be listed in menu 218 together with the number of employees available in each category and a selection number from "1" to "18".

Menu number 218 is divided into subcategories of degreed and nondegreed electronics engineers. After each category there is a number sometimes represented herein by the letter "X" which represents the total number of personnel currently available in the job title code file 10 having the job title indicated. The numbers on the left hand side of the job title shown in 218 are selection numbers. At this point, the user would select the job title most closely matching the job criteria to be matched. As discussed above, the program allows for multiple entries. Assuming that the user wants digital engineers, he would select number "5" from menu 218, ELECTRONIC DIGITAL ENGINEER.

As can be appreciated by those skilled in the art, the user could in this way match various job title criteria through this selection process. The example embodiment of the program includes subcategory menus for each of the nine selections shown in menu 208. These are shown in FIGS. 3a, 3b and 3c. Directing attention to menu number 208, selection number 1 would pull up menu 212 for degreed and nondegreed ARCHITECTURAL/FACILITIES ENGINEERS, selection number 2 would pull up menu number 214 for AEROSPACE ENGINEERS. Similarly, selection numbers "3", "4", "5", "6", "7", and "8" would respectively bring up menus 216, 217, 218, 220, 222 and a listing of personnel in categories otherwise not listed.

Referring again to FIG. 2c, the title ELECTRONIC DIGIT—(71) will now appear in the job class selections box 201a. The user will then proceed to select the next main category. Assuming the user follows the sequence enumerated in menu 200 as shown in FIG. 2b, he would choose selection number "2" INDUSTRIAL EXPERIENCE. Upon entering this selection, the program will display menu number 204. The user will then select manufacturing or non manufacturing selections "1" or "2", respectively. As in all of the menus used in this system, if the user has entered a menu which is not useful to him, he can input selection number "0" which would result in an exit from that menu to the previous menu selected. Assuming that the user selects "2" MANUFACTURING, the program will display menu 408 as shown in FIG. 4b listing the selection numbers "1"–"9" for broad categories of manufacturing industrial experience. In this example, assume that the user selects selection number "6" MACHINERY/COMPUTERS. Upon entering selection "6" the program will display menu 426 as shown in FIG. 4c. If the user is looking for an employee experienced in computers and microprocessors, he will then select selection number "6" showing an availability of 275 employees in this category.

Figure 4A:
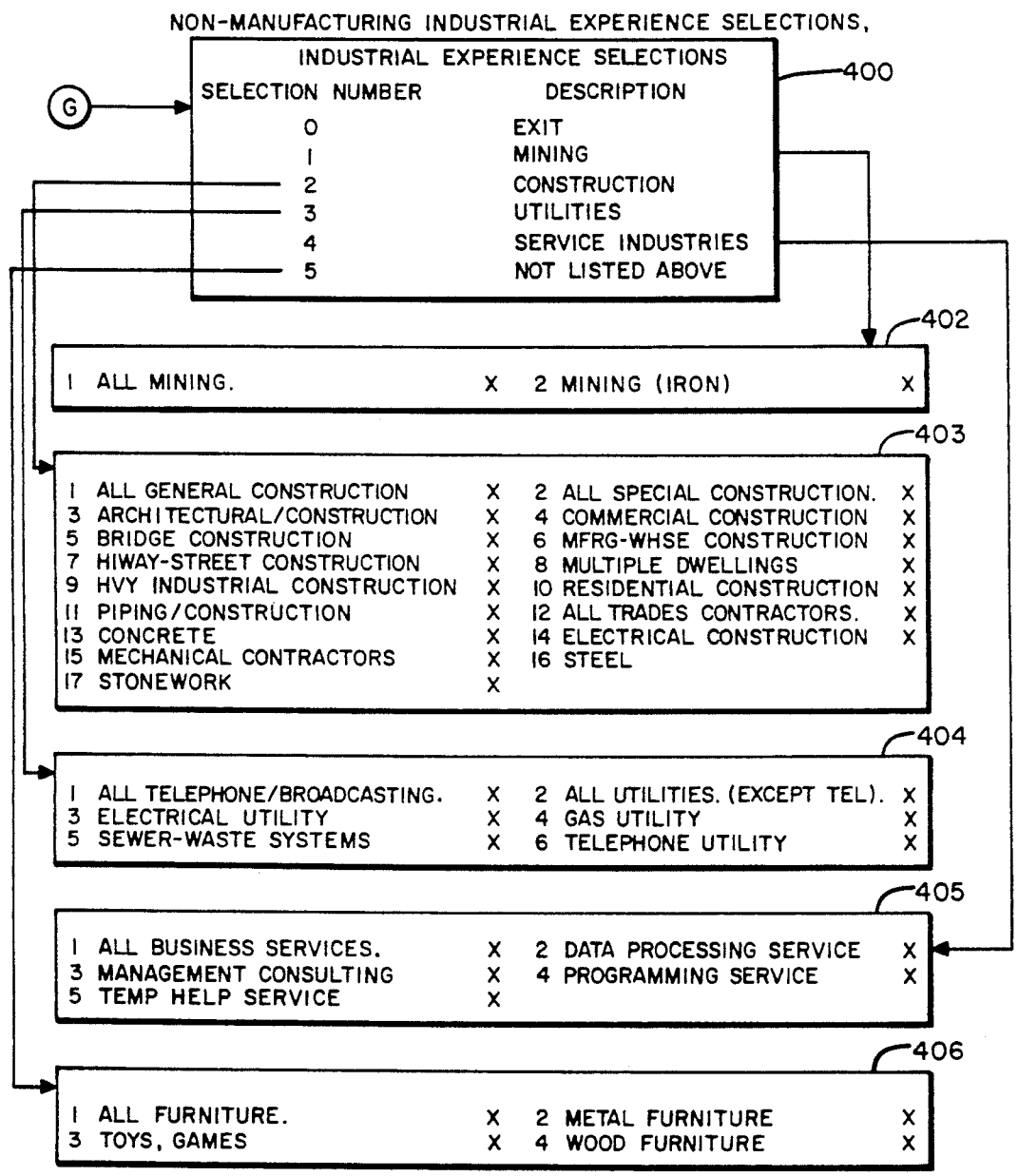
Figure 4B:
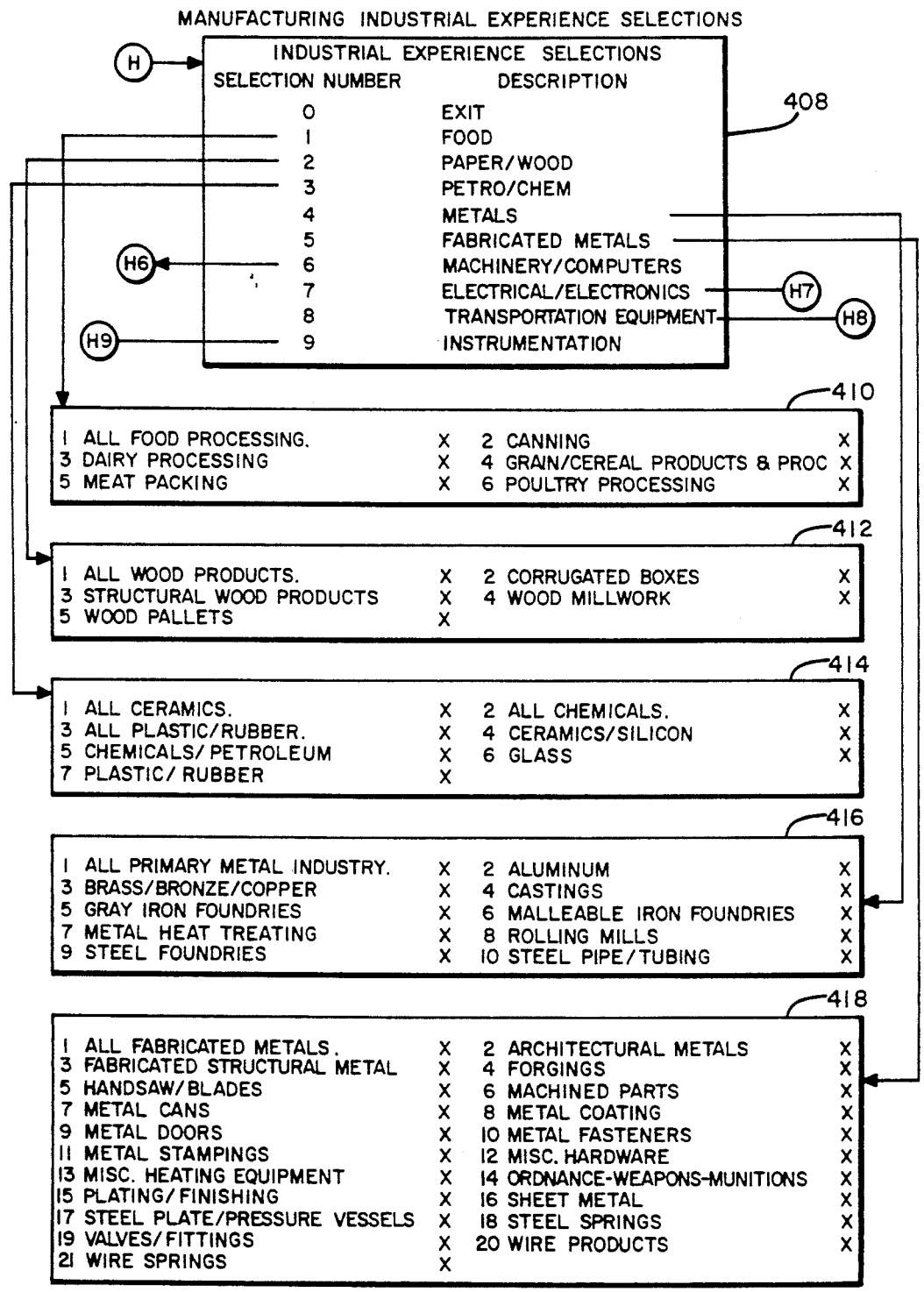

The selections possible under industrial experience are shown in FIGS. 4a–4c and include menu number 400 wherein selection of menus 402, 403, 404, 405 and 406 are possible through inputting selection numbers "1"–"5". Under the manufacturing industrial experience selection menu 408, the user could choose from menus 410 for FOOD, menu 412 for PAPER/WOOD, menu 414 for PETRO/CHEM, menu 416 for METALS, menu 418 for FABRICATED METALS, menu 426 for MACHINERY/COMPUTERS, menu 424 for ELECTRICAL/ELECTRONICS, menu 422 for TRANSPORTATION EQUIPMENT, and menu 420 for INSTRUMENTATION. As in the case of job titles, the user may select more than one industry as criteria to be matched.

Referring again to FIG. 2b and continuing with the example of operation of the program, reference is again made to menu 200. At this point selections have been made from the job title category and the industrial experience category. Note that a match between those two main category selections could be performed at this time. It is not necessary to pick a special selections category. However, in most cases, it is useful to make such a selection if the user or potential employer has a particular job environment calling for special expertise on particular machinery, for example. Assuming that the user in this example wishes to make a special selection, he would input selection number "3" from the main category menu. At this point, the match system of the invention would display menu number 206 having the special qualifications selections. Menu 206 is a fixed format menu. The user would then select the special qualifications which most closely matched his requirements from menu 206 to display the detailed special qualifications. If the user were, for example, interested in a particular type of microprocessor chip, he may select number "8" HARDWARE.

Referring now to FIG. 5c, this selection would result in the display of menu 512 in FIG. 5c. Still referring to FIG. 5c, if the user's interest were in an employee with, for example, Motorolla chip experience, he would input selection number "15" showing an availability of 23 potential employees. As in the other selection modes, the user would then be asked if he wanted to make another selection. In this case, let us assume that he wishes to select a second selection from menu 512. He could respond appropriately in response to a prompt by entering "Y" (for "yes"). He would then re-enter menu 512 as before and select, for example, MACINTOSH COMPUTER, showing an availability of 13. Assuming that his list of special qualifications was then exhausted, the user would then exit the special selection menus by responding "N" (for "no") to a prompt. Special selection menus available are listed on menu 206 in FIG. 2b.

Referring now to FIG. 2c the main menu screen 200 is shown at the point where, in this explanatory example, all of the above selections have been made. The screen now shows ELECTRONIC DIGIT —(71) in the job class selections box 201a, COMPUTER/MICROP—(275) in the industry selections box 201b, and MOTOROLA—(23) and MACINTOSH COMPUT—(13) in the special selections box 201c. At this point, the user can view all of his selections to ascertain whether or not his job criteria is matched as closely as possible. The user has the option of adding more categories in each of the selections 201a, 201b or 201c. If the user is satisfied with the selections he has made, he will then input selection "9" from the keyboard to enable the program to run the match.

Referring again to FIG. 1, at this point, the computer, using a logical formula looks at each of the temporary files 12, 22 and 32 for employee codes which are common to all three of these files. If an employee matches at least one category in each of the three temporary files, that employee will be considered a match for the job criteria selected. After all the employees meeting the above matching criteria have been selected, their employee numbers are compared to a fourth temporary file which contains the employees having company experience to the matched employees. This is for the purpose of merely printing out the company experience information if applicable so that the user will know which matched employees have previously worked for the company requesting the information. Each of the selection criteria appearing in blocks 201a, 201b, and 201c is given a field number for the purposes of tracking against the employees as will be explained more in detail below. At block 100, the matched employee numbers are then merged through well known programming means with information from the personnel file 60 (optionally) and the client file 50 in order to display and/or print out a report in substantially the form of FIG. 6.

Referring now to FIG. 6, one example of a report displayed or printed by the computer software embodying the method of the invention is shown. The report includes a heading including the name of the client contact, in this case "Smith, Joe", the name of the client, "ABC Co.", the opening "ELECT.ENG." and certain code numbers including a requisition number "22222". Moving down the report, the next section includes an education code legend and the match criteria as selected in the above example. Note that each of the matched criteria selection has now been assigned a number which depends upon its particular position in the boxes 201a, 201b and/or 201c. For example, matched criteria ELECTRONIC DIGITAL ENGINEER—(71) has been assigned position number 1. ABC Co. experience—(68) has been assigned field number 10. In general field number 10 is reserved for the company experience matching.

Yet a third section of the report, moving down the page, includes the employee number under the heading FILE#, NAME, EXP, EDUC, RATE and the numbers "1", "4", "7" and "10" corresponding to the match criteria numbers. The file number column corresponds to the employee code. The employee's name will appear in the name column. The EXP column shows the years of experience of the employee since graduating from school or since commencing his or her career. The EDUC column contains the education code corresponding to the legend printed above on the form. The rate column states the hourly billing rate required for that particular personnel. The comments column is merely a column of blank lines for use by persons reading the report.

As can be seen by looking at FIG. 6, at least one name, NAME2 included matches designated by asterisks in all four of the match criteria including the experience column number 10. The other names listed on the report matched all of the criteria "1", "4" and "7".

At this point, if the user wishes to view or print out the resumes of any of the above candidates, means are provided to access the resume file 70 for printing out the candidates corresponding to the file number and name chosen. In this way resumes can be provided to carry along with the search report.

As can be discerned from the example detailed above, the program which embodies the method of the invention maintains a count of the number of files in each specific code. This is very important information. For example, it is possible that a job title may exist in the program for which there are no currently available employee candidates in the database. It can be appreciated that a search based upon a nullity is going to result in no matches unless it is logically "OR'd" with other selection categories. Conversely, if a category contains an extraordinarily high number of candidates which would precipitate an inordinately long review of resumes, the user can continue the selection process to reduce this number.

For example, if the user were searching for digital electronic engineers, and if this category showed that more than 100 such candidates were available, the user would then try to reduce this number to a more reasonable quantity. If, for example, the user made a second choice which was an industrial selection for computers, and the user noted from the menu displayed that more than 350 employee candidates existed for this category, such a choice would probably not significantly reduce the number of available candidates since, more than likely, every digital engineer has had industrial experience in manufacturing computers. Therefore, the user might then want to add a specialty such as a particular brand name of CAD system which would have, for example, 20 candidates. Having this information, the user would now know that the total number of potential matching candidates would be no greater than 20 and, most likely, less than 20 since some of those will not, in all probability be digital engineers. At this point, the user can run a match and would, for example, receive a report showing 9 or 10 candidates that met all three of the requirements. The user could then review the list and eliminate some of the candidates on the basis of total experience, for example, or on the basis of their hourly rate which would be visible on the CRT screen. If this approach did not reduce the list sufficiently, the criteria could be revised to either increase or decrease the number of candidates depending upon the desired end result.

Another reason for the desirability of reporting the quantity of persons available in any given category may be appreciated by the following example. Assume the user is searching in a specific category and the program menu displayed indicates that there are no more than six people in the specified category. He would probably search no further until he had checked out the resumes and experience of those six candidates. In this way he could greatly reduce the amount of time necessary for a search.

Referring now to FIG. 7, the system embodying the method of the invention can be used to generate other reports such as the database status report shown. Generation of this report would be accomplished using the file structure shown in FIG. 1a and equipment shown in FIG. 1c. A menu, similar to the job title menus described herein would be displayed on the screen containing broad categories of candidates in English. If a user was in the planning stages of a large product, he may not be interested in the actual names of people since they may not be ready to hire during the planning stages. Further, when the project did come to fruition, the currently available candidates would probably be unavailable due to the passage of time. However, the customer may want a sample of the market at the moment to aid in planning. The database status report would indicate the total number of candidates currently available and also list the average billing rate, the high billing rate, and the low billing rate for those candidates. For example, if the customer were interested only in mechanical engineers, the database status report would provide information as to the number of mechanical engineers available, and the corresponding billing rate information. This report can be done on broad categories of selection criteria including industrial experience and special skills so that for budgetary or planning purposes, the user will have useful information on the current status of the labor market. Such database status reports may also be run optionally on a periodic basis, such as weekly, to be used as a tool in overviewing the numbers and types of candidates available in the system.

Again drawing attention to FIG. 1a, note that the system includes a follow-up file 105. Data for the follow-up file is generated for each search run on the program embodying the method of the invention. The follow-up file includes English and coded information including the customer number, the customer name, the selection criteria used in the search, cover sheet, or background information as supplied by the customer and the employee codes for all employees matched by the search program. This information is then used by the search firm employing the system of the invention to generate a follow-up report. Drawing attention now to FIG. 8, a follow chart of the method of the system of the invention used to generate such a follow-up report is shown. Using the preferred embodiment of the system of the invention as described above, the method of the invention first checks all available employee candidates against the selection criteria contained in the follow-up file at step 602. The program then updates the follow-up file at step 604 by adding any new candidates found to match the selection criteria. Next, at step 606, all candidates now contained in the follow-up file are tagged as "original", "not available", and "added". An "original" tag means that a candidate was found in the original run of the search report against the same criteria, a "not available" tag indicates that an employees was previously found in a prior search but has since been removed from the database of available candidates and an "added" tag indicates that this employee candidate has been added since the previous search. That is, an "added" employee candidate would not have had records residing on the available data file during the last run of the search being followed up. At step 608 a report is generated which is very similar to the report shown in FIG. 6 with the addition of the "original", "not available" and "added" tags appearing by each employee name.

The system may be used to perform other functions related to employee candidate searches. Again, drawing attention to FIG. 1a, file number 101, open job requirements, is shown. As is the case with the follow-up file 105, the open job requirements file is generated by the search program of the invention upon the completion of a job requirement search. The open job requirements file contains information similar to the follow-up file including customer name, customer number and job criteria divided into special SIC and job title databases, as well as "cover sheet" or "background information". The information contained in the open job requirements file is used to run a "reverse match" program using the system embodying the method of the invention. This is typically done at the point in time when information on the employee candidate is initially introduced into the system. This information ma be entered by the candidates themselves since the program is designed to prompt all needed information from the user thereby guiding the user through the program using a series of helpful prompts. The system then encodes the information entered by the candidate and, upon completion of the input phase may run a reverse match such as is shown in flow-chart form in FIG. 9.

Referring now to FIG. 9, the employee may input his information as required by the screen prompts including experience, special skills, etc. at step 650. Once the input phase is completed, the program will compare the employee qualification with all of the open job requirements files to ascertain whether or not any matches occur. This is done generally in the same manner as a search as described above except that the selection criteria are contained within the open job requirements files and are not individually entered by a user from the keyboard. This comparison is done at step 652. If any matches are found, the program will then display the matched open jobs at step 654 and generate a report at step 656.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For example, the system could be reorganized to search a first selection criterion and establish a single temporary file based on that first criterion. The system could then allow inputs of further selection criteria, for example second and third criteria, and apply that subsequent criteria only to a search of the single temporary file which was created from the initial search. Such a system would be very fast since it operates by constantly reducing the files in use. However, such a system would not be as flexible as the preferred embodiment described herein since its sequential nature makes each temporary file generated dependent upon the file before it. In contrast, the preferred embodiment establishes three temporary files and looks for a common employee code in all three files. Any one of the three files can be altered or reviewed without affecting the other two since they are not sequential in nature.

Another alternate embodiment of the method of the invention includes using a personal database with one record for each candidate instead of the first, second and third data files 10, 20 and 30 used in the preferred embodiment. In such an alternate system, each record would contain individual fields for information including job classification codes, industrial experience, starting date and technical employment, pay rate, equal opportunity employment information, type of employment desired, and other pertinent information. The system of this alternate embodiment sort through all individual records and stores temporarily only those people who match the encoded job description, industrial description and special skills. In contrast to the preferred embodiment, this alternative embodiment cannot ignore files not necessary to the selection criteria. Whereas the preferred method directs the computer to find a certain number and to establish a temporary file, only for those candidates that match the certain number. Therefore, using the preferred embodiment, the computer only has to search a very limited number of files whereas using the alternate embodiment where each applicant has a rather lengthy file, the computer must search through all of the records in each file in order to assure that a potential candidate is not overlooked.

The aforesaid alterative embodiment also requires reservation of a fixed amount of memory for each employee candidate, regardless of experience. This result in a compromise situation wherein there is usually too much computer memory reserved for a beginner and frequently not enough space for a very experienced employee candidate. As can be appreciated by those skilled in the art, the preferred method of the invention is not so restricted since any number of entries can be made in each classification for each employee. Therefore, each employee can have any number of records in a given file or no records depending upon his or her qualifications. The difference in organization between the alternate embodiment and the preferred embodiment results in an improvement on the order of 4 to 1 in run time for the preferred embodiment. For example, a search that the alternate embodiment requires eight minutes to perform can be done in approximately two minutes using the preferred embodiment.

What is claimed is:

Appendix TABLE VIII-1

| list Record # | DESCRIPT | CODE | I | CNT1 | MKY |
|---|---|---|---|---|---|
| 193 | METROLOGY TECHNICIAN | 012260013 | T | 1 | 0 |
| 198 | TEACHER, SECONDARY SCHOOL | 091227010 | M | 0 | |
| 199 | | 005061017 | | 0 | |
| 200 | | 003181101 | | 0 | |
| 238 | UNASSIGNED | 822500000 | C | 0 | |
| 239 | UNASSIGNED | 822600000 | C | 0 | |
| 240 | UNASSIGNED | 822700000 | C | 0 | |
| 250 | ACCOUNTING CLERK | 216482010 | M | 0 | |
| 253 | | 019067018 | | 1 | |
| 254 | | 07067014N | | 0 | |
| 255 | | 007180026 | | 0 | |
| 256 | | | | 5 | |
| 257 | ACCOUNTANT | 160167026 | | 0 | |
| 258 | | 020061014 | | 1 | |
| 259 | | 008160014 | | 1 | |
| 261 | CERTIFIED PUBLIC ACCOUNTANT | 160167014 | M | 1 | |
| 262 | ELECTRICIAN | 84261010 | | | |
| 1 | ARCHITECT | 001061010 | E | 4 | 1010001 |
| 2 | LANDSCAPE ARCHITECT | 001061018 | E | 0 | 1010002 |
| 8 | AERONAUTICAL ENGINEER | 002061014 | E | 6 | 1020001 |
| 9 | AERONAUTICAL DESIGN ENGR* | 002161014 | E | 0 | 1020002 |
| 30 | CIVIL ENGINEER | 005061014 | E | 11 | 1030001 |
| 33 | CIVIL DESIGN ENGR* | 005161014 | E | 1 | 1030002 |
| 152 | CONSTRUCTION ENGINEER | 005061019 | E | 7 | 1030003 |
| 153 | CONSTRUCTION ENGR* | 005161019 | E | 2 | 1030004 |
| 31 | STRUCTURAL ENGINEER | 005061034 | E | 10 | 1030005 |
| 34 | STRUCTURAL DESIGN ENGR* | 005161034 | E | 4 | 1030006 |

Appendix TABLE VIII-1-continued

| list Record # | DESCRIPT | CODE | I | CNT1 | MKY |
|---|---|---|---|---|---|
| 197 | WATERWORKS ENGINEER | 005067010 | E | 0 | 1030007 |
| 196 | WATERWORKS ENGR* | 005167010 | E | 0 | 1030008 |
| 13 | ELECTRICAL POWER ENGINEER | 003061018 | E | 10 | 1040001 |
| 23 | ELECTRICAL POWER DESIGN ENGR* | 003161018 | E | 6 | 1040002 |
| 12 | ELECTRICAL START-UP ENGINEER | 003061009 | E | 3 | 1040003 |
| 22 | ELECTRICAL START-UP ENGR* | 003161009 | E | 1 | 1040004 |
| 15 | ELECTRONIC ANALOG ENGINEER | 003061037 | E | 26 | 1050001 |
| 25 | ANALOG DESIGN ENGR* | 003161037 | E | 4 | 1050002 |
| 10 | ELECTRONIC COMPONENT ENGINEER | 003061003 | E | 1 | 1050003 |
| 20 | ELECTRONIC COMPONENT ENGR* | 003161003 | E | 2 | 1050004 |
| 16 | ELECTRONIC DIGITAL ENGINEER | 003061039 | E | 96 | 1050005 |
| 26 | DIGITAL DESIGN ENGR* | 003161039 | E | 16 | 1050006 |
| 14 | ELECTRONIC LOGIC ENGINEER | 003061035 | E | 3 | 1050007 |
| 24 | LOGIC DESIGN ENGR* | 003161035 | E | 1 | 1050008 |
| 11 | ELECTRONIC MFRG ENGINEER | 003061005 | E | 4 | 1050009 |
| 21 | ELECTRONIC MFGR ENGR* | 003161005 | E | 0 | 1050010 |
| 139 | ELECTRONIC QUALITY ENGINEER | 003067054 | E | 5 | 1050011 |
| 161 | ELECTRONIC QUALITY ENGR* | 003167054 | E | 0 | 1050012 |
| 17 | ELECTRONIC TEST ENGINEER | 003061042 | E | 15 | 1050013 |
| 27 | ELECTRONIC TEST ENGR* | 003161042 | E | 5 | 1050014 |
| 175 | I & C ENGINEER | 003061011 | E | 3 | 1050015 |
| 176 | I & C ENGR* | 003161011 | E | 0 | 1050016 |
| 138 | BSET, BSIT | 003061099 | E | 10 | 1050017 |
| 117 | PHYSICIST | 023061014 | E | 9 | 1050018 |
| 143 | CONFIGURATION ENGINEER | 012067010 | E | 2 | 1060001 |
| 156 | CONFIGURATION ENGR* | 012167010 | E | 2 | 1060002 |
| 162 | COST ESTIMATING ENGINEER | 012067048 | E | 7 | 1060003 |
| 163 | COST ESTIMATING ENGR* | 012167048 | E | 1 | 1060004 |
| 93 | FACILITIES PLANNER ENGINEER | 019061018 | E | 13 | 1060005 |
| 103 | FACILITIES PLANNER ENGR* | 019161018 | E | 5 | 1060006 |
| 65 | INDUSTRIAL ENGINEER | 012067030 | E | 24 | 1060007 |
| 74 | INDUSTRIAL ENGINEER | 012167030 | E | 11 | 1060008 |
| 66 | MANUFACTURING ENGINEER | 012067042 | E | 44 | 1060009 |
| 75 | MANUFACTURING ENGR* | 012167042 | E | 32 | 1060010 |
| 71 | MATERIAL PLANNING ENGINEER | 012087010 | E | 0 | 1060011 |
| 80 | MATERIAL PLANNING ENGR* | 012187010 | E | 1 | 1060012 |
| 142 | N-C PROGRAMMER | 007067018 | M | 0 | 1060013 |
| 53 | N C PROGRAMMER* | 007167018 | M | 4 | 1060014 |
| 67 | PRODUCTION ENGINEER | 012067046 | E | 10 | 1060015 |
| 76 | PRODUCTION ENGR* | 012167046 | E | 12 | 1060016 |
| 68 | PRODUCTION SCHEDULER | 012067050 | M | 6 | 1060017 |
| 77 | PRODUCTION SCHEDULER* | 012167050 | M | 5 | 1060018 |
| 63 | QA START-UP ENGINEER | 012061009 | E | 0 | 1060019 |
| 72 | QA START-UP ENGR* | 012161009 | E | 0 | 1060020 |
| 69 | QUALITY ENGINEER | 012067054 | E | 24 | 1060021 |
| 78 | QUALITY ENGR* | 012167054 | E | 14 | 1060022 |
| 64 | SAFETY ENGINEER | 012061014 | E | 4 | 1060023 |
| 73 | SAFETY ENGR* | 012161014 | E | 1 | 1060024 |
| 70 | TOOLING PLANNING ENGINEER | 012067074 | E | 4 | 1060025 |
| 79 | TOOLING PLANNER ENGR* | 012167074 | E | 3 | 1060026 |
| 43 | HEAT TRANSFER ENGINEER | 007081010 | E | 0 | 1070001 |
| 54 | HEAT TRANSFER ENGR* | 007181010 | E | 0 | 1070002 |
| 38 | MECHANICAL HVAC ENGINEER | 007061018 | E | 3 | 1070003 |
| 48 | HVAC-FACILITIES DESIGN ENGR* | 007161018 | E | 4 | 1070004 |
| 141 | MECHANICAL START-UP ENGINEER | 007061009 | E | 1 | 1070005 |
| 47 | MECHANICAL START-UP ENGR* | 007161009 | E | 0 | 1070006 |
| 42 | PLANT ENGINEER | 007067014 | E | 4 | 1070007 |
| 52 | PLANT ENGR* | 007167014 | E | 6 | 1070008 |
| 41 | E-M PACKAGING ENGINEER | 007061044 | E | 4 | 1070009 |
| 39 | MECHANICAL ENGINEER | 007061022 | E | 41 | 1070010 |
| 40 | TOOLING ENGINEER | 007061026 | E | 1 | 1070011 |
| 91 | BIOMEDICAL ENGINEER | 019061010 | E | 1 | 1080001 |
| 101 | BIOMEDICAL ENGR* | 019161010 | E | 0 | 1080002 |
| 173 | CAD IMPLEMENTATION ENGINEER | 019041010 | E | 2 | 1080003 |
| 174 | CAD IMPLEMENTATION ENGR* | 019141010 | E | 2 | 1080004 |
| 140 | CERAMIC ENGINEER | 006061014 | E | 1 | 1080005 |
| 191 | CERAMIC ENGR* | 006161014 | E | 0 | 1080006 |
| 57 | CHEMICAL ENGINEER/CHEMIST | 008061018 | E | 38 | 1080007 |
| 190 | CHEMICAL ENGR/CHEM* | 008161018 | E | 0 | 1080008 |
| 171 | CIM/CAM IMPLEMENTATION ENGINEER | 019041020 | E | 0 | 1080009 |
| 172 | CIM/CAM IMPLEMENTATION ENGR* | 019141020 | E | 0 | 1080010 |
| 92 | COMPONENT ENGINEER | 019061014 | E | 3 | 1080011 |
| 102 | COMPONENT ENGR* | 019161014 | E | 0 | 1080012 |
| 145 | DOCUMENTATION ENGINEER | 019067015 | E | 5 | 1080013 |
| 187 | DOCUMENTATION ENGR* | 019167015 | E | 1 | 1080014 |
| 95 | ENGINEERING PROJECT MANAGER | 019067014 | E | 44 | 1080015 |
| 105 | ENGINEERING PROJECT MANAGER* | 019167014 | E | 11 | 1080016 |
| 167 | HUMAN FACTORS ENGINEER | 045061014 | E | 0 | 1080017 |
| 168 | HUMAN FACTORS ENGR* | 045161014 | E | 0 | 1080018 |
| 94 | LOGISTICS ENGINEER | 019067010 | E | 1 | 1080019 |

Appendix TABLE VIII-1-continued

| list Record # | DESCRIPT | CODE | I | CNT1 | MKY |
|---|---|---|---|---|---|
| 104 | LOGISTICS ENGR* | 019167010 | E | 2 | 1080020 |
| 96 | MAINTAINABILITY ENGINEER | 019081010 | E | 2 | 1080021 |
| 106 | MAINTAINABILITY ENGR* | 019181010 | E | 1 | 1080022 |
| 179 | MATERIALS ENGINEER | 019061015 | E | 5 | 1080023 |
| 180 | MATERIALS ENGR* | 019161015 | E | 1 | 1080024 |
| 60 | METALURGICAL ENGINEER | 011061022 | E | 2 | 1080025 |
| 155 | METALURGICAL ENGR* | 011161022 | E | 0 | 1080026 |
| 159 | NUCLEAR ENGINEER | 015061014 | E | 0 | 1080027 |
| 192 | NUCLEAR ENGR* | 015161014 | E | 0 | 1080028 |
| 144 | OPTICAL ENGINEER | 019061028 | E | 0 | 1080029 |
| 165 | OPTICAL ENGR* | 019161028 | E | 0 | 1080030 |
| 100 | PACKAGING ENGINEER | 019087010 | E | 5 | 1080031 |
| 110 | PACKAGING ENGR* | 019187010 | E | 1 | 1080032 |
| 97 | PHOTOGRAPHIC ENGINEER | 019081014 | E | 1 | 1080033 |
| 107 | PHOTOGRAPHIC ENGR* | 019181014 | E | 0 | 1080034 |
| 98 | POLLUTION CONTROL ENGINEER | 019081018 | E | 2 | 1080035 |
| 108 | POLLUTION CONTROL ENGR* | 019181018 | E | 1 | 1080036 |
| 99 | RELIABILITY ENGINEER | 019081022 | E | 7 | 1080037 |
| 109 | RELIABILITY ENGR* | 019181022 | E | 2 | 1080038 |
| 59 | WELDING ENGINEER | 011061026 | E | 0 | 1080039 |
| 61 | WELDING ENGR* | 011161026 | E | 1 | 1080040 |
| 251 | ENVIRONMENTAL ANALYSIST | 029081010 | E | 5 | 1080041 |
| 252 | PETROLEUM ENGINEER | 010061018 | E | 2 | 1080042 |
| 3 | ENERGY TECHNICIAN | 001160010 | T | 0 | 2010001 |
| 186 | PLANT-HVAC TECHNICIAN | 007160014 | T | 4 | 2010002 |
| 32 | CIVIL TECHNICIAN | 005160014 | T | 2 | 2030001 |
| 194 | LAND SURVEYOR | 018167018 | T | 0 | 2030002 |
| 195 | HYDROGRAPHER | 025264010 | T | 0 | 2030003 |
| 18 | ELECTRICAL TECHNICIAN | 003160010 | T | 8 | 2040001 |
| 19 | ELECTRONIC TECHNICIAN | 003160014 | T | 153 | 2050001 |
| 177 | I & C TECHNICIAN | 003260011 | T | 1 | 2050002 |
| 188 | MICROSCOPIC INSPECTOR | 711280010 | T | 0 | 2050003 |
| 81 | I. E. TECHNICIAN | 012260010 | T | 3 | 2060001 |
| 82 | QUALITY TECHNICIAN | 012260014 | T | 27 | 2060002 |
| 132 | FLUID POWER TECHNICIAN | 600280010 | T | 0 | 2070001 |
| 148 | INSPECTOR | 710380038 | T | 24 | 2070002 |
| 133 | MACHINIST | 600280022 | T | 7 | 2070003 |
| 45 | MECHANICAL TECHNICIAN | 007160026 | T | 27 | 2070004 |
| 135 | MODEL MAKER | 777260010 | T | 7 | 2070005 |
| 134 | TOOL MAKER | 601280042 | T | 7 | 2070006 |
| 137 | WELDER | 819384010 | T | 3 | 2070007 |
| 185 | BIOCHEM TECH | 041160026 | T | 1 | 2080001 |
| 58 | CHEMICAL TECHNICIAN | 008260010 | T | 19 | 2080002 |
| 166 | ELEC ASSY/SOLDERER | 800380010 | T | 11 | 2080003 |
| 62 | METALURGICAL TECHNICIAN | 011260010 | T | 2 | 2080004 |
| 147 | MICROBIOLOGY TECHNICIAN | 078260014 | T | 1 | 2080005 |
| 129 | NON-DESTRUCTIVE TECH | 199360010 | T | 7 | 2080006 |
| 160 | NUCLEAR PLANT TECHNICIAN | 710280030 | T | 0 | 2080007 |
| 46 | OPTICAL TECHNICIAN | 007160030 | T | 0 | 2080008 |
| 118 | PHOTO-OPTICAL TECHNICIAN | 029280010 | T | 4 | 2080009 |
| 178 | POLLUTION CONTROL TECHNICIAN | 029260014 | T | 0 | 2080010 |
| 136 | SOLDERER | 813380010 | T | 6 | 2080011 |
| 111 | BUSINESS PROGRAMMER | 020062014 | P | 20 | 3010001 |
| 114 | BUSINESS PROGRAMMER* | 020162014 | P | 11 | 3010002 |
| 112 | DATA PROCESSING MANAGER | 020067018 | P | 0 | 3010003 |
| 115 | DP BUSINESS MANAGER* | 020167018 | P | 0 | 3010004 |
| 260 | NETWORK PROGRAMMER | 020062015 | P | 1 | 3010005 |
| 146 | ELECTRONIC SOFTWARE ENGINEER | 020067003 | P | 51 | 3020001 |
| 164 | ELECTRONIC SOFTWARE ENGR* | 020167003 | P | 7 | 3020002 |
| 113 | SCIENTIFIC PROGRAMMER | 020067022 | P | 75 | 3020003 |
| 116 | SCIENTIFIC PROGRAMMER* | 020167022 | P | 27 | 3020004 |
| 181 | STATISTICIAN | 020067026 | P | 5 | 3020005 |
| 182 | STATISTICIAN* | 020167026 | P | 0 | 3020006 |
| 4 | ARCHITECTURAL DESIGNER | 001161010 | D | 4 | 4010001 |
| 6 | ARCHITECTURAL DRAFTER | 001261010 | D | 20 | 4010002 |
| 86 | HVAC DRAFTER | 017261034 | D | 11 | 4010003 |
| 5 | LANDSCAPE DESIGNER | 001161018 | D | 0 | 4010004 |
| 7 | LANDSCAPE DRAFTER | 001261014 | D | 0 | 4010005 |
| 88 | PIPING DESIGN-DRAFTER | 017281030 | D | 14 | 4010006 |
| 85 | PLANT LAYOUT DRAFTER | 017261026 | D | 16 | 4010007 |
| 87 | PLUMBING DRAFTER | 017261038 | D | 3 | 4010008 |
| 150 | SPRINKLER DESIGN DRAFTER | 017281038 | D | 2 | 4010009 |
| 90 | CARTOGRAPHIC DRAFTER | 018261010 | D | 0 | 4030001 |
| 35 | CIVIL DRAFTER | 005281010 | D | 4 | 4030002 |
| 36 | STRUCTURAL DRAFTER | 005281014 | D | 18 | 4030003 |
| 28 | ELECTRICAL DRAFTER | 003281010 | D | 15 | 4040001 |
| 29 | ELECTRONIC DRAFTER | 003281014 | D | 22 | 4050001 |
| 154 | PRINTED CIRCUIT DESIGNER | 003181014 | D | 22 | 4050002 |
| 83 | CHECKER | 017161010 | D | 7 | 4070001 |
| 51 | E-M PACKAGING DESIGNER | 007161044 | D | 26 | 4070002 |

Appendix TABLE VIII-1-continued

| list Record # | DESCRIPT | CODE | I | CNT1 | MKY |
|---|---|---|---|---|---|
| 149 | ELECTRO-MECHANICAL DRAFTER | 017261044 | D | 15 | 4070003 |
| 49 | MECHANICAL DESIGNER | 007161022 | D | 56 | 4070004 |
| 56 | MECHANICAL DETAIL DRAFTER | 007281010 | D | 30 | 4070005 |
| 84 | MECHANICAL LAYOUT DRAFTER | 017261014 | D | 47 | 4070006 |
| 50 | TOOLING DESIGNER | 007161026 | D | 24 | 4070007 |
| 55 | TOOLING DRAFTER | 007261022 | D | 7 | 4070008 |
| 169 | GRAPHIC DESIGNER | 141061018 | M | 1 | 4080001 |
| 170 | GRAPHIC DESIGNER* | 141161018 | M | 3 | 4080002 |
| 125 | INDUSTRIAL DESIGNER | 142061026 | M | 1 | 4080003 |
| 158 | INDUSTRIAL DESIGNER* | 142161026 | M | 0 | 4080004 |
| 124 | INTERIOR DESIGNER | 142051014 | M | 0 | 4080005 |
| 126 | INTERIOR DESIGNER* | 142151014 | M | 0 | 4080006 |
| 151 | PROPOSAL WRITER | 131067028 | M | 2 | 4080007 |
| 157 | PROPOSAL WRITER* | 131167028 | M | 1 | 4080008 |
| 127 | PURCHASING/BUYER | 162057038 | M | 6 | 4080009 |
| 128 | PURCHASING/BUYER* | 162157038 | M | 6 | 4080010 |
| 37 | SALES ENGINEER | 007051015 | M | 10 | 4080011 |
| 44 | SALES ENGR* | 007151015 | M | 6 | 4080012 |
| 122 | TECHNICAL EDITOR | 132067018 | M | 4 | 4080013 |
| 123 | TECHNICAL EDITOR* | 132167018 | M | 1 | 4080014 |
| 120 | TECHNICAL WRITER | 131067026 | M | 20 | 4080015 |
| 121 | TECHNICAL WRITER* | 131167026 | M | 18 | 4080016 |
| 130 | DRAFTING/CONTROL CLERK | 206367010 | D | 0 | 4080017 |
| 131 | COMPUTER OPERATOR* | 213362010 | M | 1 | 4080018 |
| 89 | TECHNICAL ILLUSTRATOR | 017281034 | D | 9 | 4080019 |
| 119 | INSTRUCTOR* | 097227014 | M | 12 | 4080020 |
| 183 | TELEPHONE EXPERIENCE | 822001002 | C | 1 | 5010001 |
| 201 | CABLE PLACEMENT TECHNICIAN | 822100001 | C | 0 | 5020001 |
| 202 | CABLE SPLICER INSTALLATION | 822100002 | C | 0 | 5020002 |
| 203 | CABLE SPLICER REPAIR | 822100003 | C | 0 | 5020003 |
| 204 | CABLE SPLICER FIBER | 822100004 | C | 0 | 5020004 |
| 205 | CONSTRUCTION SUPERVISOR | 822100005 | C | 0 | 5020005 |
| 206 | DISTRIBUTION ENGINEER-ASSOCIATE | 822100010 | C | 0 | 5020006 |
| 207 | DISTRIBUTION ENGINEER | 822100011 | C | 0 | 5020007 |
| 208 | DISTRIBUTION ENGINEER-PLANNING | 822100020 | C | 0 | 5020008 |
| 209 | REPAIR CLERK | 822200000 | C | 0 | 5030001 |
| 210 | STATION EQUIPMENT TECH.-INSTALLATION | 822200001 | C | 0 | 5030002 |
| 211 | STATION EQUIPMENT TECH.-REPAIR | 822200002 | C | 0 | 5030003 |
| 212 | STATION KEY EQUIPMENT TECHNICIAN | 822200003 | C | 0 | 5030004 |
| 213 | STATION EQUIPMENT-COIN | 822200006 | C | 0 | 5030005 |
| 214 | STATION EQUIPMENT-DATA | 822200007 | C | 0 | 5030006 |
| 215 | MOBILE RADIO CELLULAR | 822200008 | C | 0 | 5030007 |
| 216 | TECHNICIAN CABLE TV | 822200009 | C | 0 | 5030008 |
| 217 | PRIVATE BRANCH EXECUTIVE-INSTALL. | 822300001 | C | 0 | 5040001 |
| 218 | PRIVATE BRANCH EXCHANGE-REPAIR | 822300002 | C | 0 | 5040002 |
| 219 | PRIVATE BRANCH EXCHANGE-ENGINEER | 822300010 | C | 0 | 5040003 |
| 220 | PRIVATE BRANCH EXCHANGE-SUPERVISOR | 822300011 | C | 0 | 5040004 |
| 221 | PREMISES SERVICE CONSULTANT | 822300012 | C | 0 | 5040005 |
| 222 | INSTRUCTOR-PBX | 822300013 | C | 0 | 5040006 |
| 223 | CENTRAL OFFICE INSTALLATION | 822400001 | C | 0 | 5050001 |
| 224 | CENTRAL OFFICE REPAIR | 822400002 | C | 0 | 5050002 |
| 225 | CENTRAL OFFICE TECHNICIAN-FRAME | 822400003 | C | 0 | 5050003 |
| 226 | CENTRAL OFFICE TECHNICIAN-SWITCHING | 822400004 | C | 0 | 5050004 |
| 227 | CENTRAL OFCICE TECHNICIAN-TOLL | 822400005 | C | 0 | 5050005 |
| 228 | CENTRAL OFFICE TECHNICIAN-MICROWAVE | 822400006 | C | 0 | 5050006 |
| 229 | CENTRAL OFFICE SUPERVISOR | 822400009 | C | 0 | 5050007 |
| 230 | CENTRAL OFFICE EQUIP-ENG. ASSOCIATE | 822400010 | C | 0 | 5050008 |
| 231 | CENTRAL OFFICE EQUIP.-ENG-FACILITIES | 822400011 | C | 0 | 5050009 |
| 232 | CENT. OFFICE EQUIP. ENG.-SWITCHING | 822400012 | C | 0 | 5050010 |
| 233 | CENT. OFFICE EQUIP. ENG.-TOLL | 822400013 | C | 0 | 5050011 |
| 234 | CENTRAL OFFICE EQUIP. ENG-MICROWAVE | 822400014 | C | 0 | 5050012 |
| 235 | CENTRAL OFFICE EQUIP. ENG.-PLANNING | 822400020 | C | 0 | 5050013 |
| 236 | CENT. OFFICE FAC. ENG.-PLANNING | 822400021 | C | 0 | 5050014 |
| 237 | BUILDING ENGINEER | 822400030 | C | 0 | 5050015 |
| 241 | COMPUTER-CLERICAL | 822800001 | C | 0 | 5060001 |
| 242 | COMPUTER-TECHNICIAN | 822800002 | C | 0 | 5060002 |
| 243 | COMPUTER-PROGRAMMER | 822800003 | C | 0 | 5060003 |
| 244 | COMPUTER SYSTEMS ANALYST | 822800004 | C | 0 | 5060004 |
| 245 | INSTRUCTOR-NETWORK | 822900001 | C | 0 | 5070001 |
| 246 | INSTRUCTOR TRAINING DELIVERY | 822900002 | C | 0 | 5070002 |
| 247 | INSTRUCTOR TRAINING DEVELOPER | 822900003 | C | 0 | 5070003 |
| 248 | TECHNICAL WRITER | 822900004 | C | 0 | 5070004 |
| 249 | MARKETING | 822900009 | C | 0 | 5070005 |
| 184 | BIOCHEMIST | 041061026 | M | 5 | 6000001 |
| 189 | TO SOLVE EOF ERROR IN GENFM612 | -------- |  | 0 | 7000001 |

Appendix TABLE VIII-2

| list Record # | DESCRIPT | CODE | CNT1 | MKY |
|---|---|---|---|---|
| 132 | ALL MINING. | 10 | 0 | 0 |
| 133 | ALL GENERAL CONSTRUCTION. | 15 | 0 | 0 |
| 134 | ALL SPECIAL CONSTRUCTION. | 16 | 0 | 0 |
| 135 | ALL TRADES CONTRACTORS. | 17 | 0 | 0 |
| 136 | ALL FOOD PROCESSING. | 20 | 0 | 0 |
| 137 | ALL WOOD PRODUCTS. | 24 | 0 | 0 |
| 138 | ALL CHEMICALS. | 28 | 0 | 0 |
| 139 | ALL PLASTIC/RUBBER. | 30 | 0 | 0 |
| 140 | ALL CERAMICS. | 32 | 0 | 0 |
| 141 | ALL PRIMARY METAL INDUSTRY. | 33 | 0 | 0 |
| 142 | ALL FABRICATED METALS. | 34 | 0 | 0 |
| 143 | ALL MACHINERY/COMPUTERS. | 35 | 0 | 0 |
| 144 | ALL ELECTRICAL/ELECTRONICS. | 36 | 0 | 0 |
| 145 | ALL TRANSPORTATION EQUIP. | 37 | 0 | 0 |
| 146 | ALL INSTRUMENTATION. | 38 | 0 | 0 |
| 147 | ALL TELEPHONE/BROADCASTING. | 48 | 0 | 0 |
| 148 | ALL UTILITIES. (EXCEPT TEL). | 49 | 0 | 0 |
| 149 | ALL BUSINESS SERVICES. | 73 | 0 | 0 |
| 150 | ALL FACILITIES/CONSTRUCTION. | 89 | 0 | 0 |
| 152 | ALL FURNITURE. | 25 | 0 | 0 |
| 165 | PACKAGING SERVICE | 7399 | 3 | |
| 166 | FOOD CONTAINERS | 2654 | 0 | |
| 167 | MFRG MISC. | 3999 | 2 | |
| 169 | CASH REGISTERS | 3574 | 3 | |
| 170 | SURVEYING: LAND, WATER, AERIAL | 8713 | 0 | |
| 171 | SURVEYING INSTRUMENTS | 3829 | 1 | |
| 172 | HYDROLOGY PROJECTS | 1627 | 12 | |
| 173 | | | 17 | |
| 174 | | 2988 | 0 | |
| 175 | NSP EXPERIENCE | KN | 0 | |
| 176 | STATISTICAL PROCESS CONTROL | SP | 0 | |
| 177 | GEOMETRIC TOLERANCING | GT | 0 | |
| 178 | STORE/OFFICE FIXTURES NON-WOOD | 2542 | 2 | |
| 179 | OFFICE/STORE FIXTURES WOOD | 2541 | 1 | |
| 180 | ELECTRICAL INDUSTRIAL EQUIP | 3629 | 2 | |
| 181 | NEWSPAPER PUBLISHING | 2711 | | |
| 1 | MINING (IRON) | 1011 | 1 | 11010001 |
| 162 | ARCHITECTURAL/CONSTRUCTION | 8911 | 64 | 11020001 |
| 7 | BRIDGE CONSTRUCTION | 1622 | 3 | 11020002 |
| 5 | COMMERCIAL CONSTRUCTION | 1542 | 36 | 11020003 |
| 52 | CONCRETE | 1771 | 10 | 11020004 |
| 11 | ELECTRICAL CONSTRUCTION | 1731 | 1 | 11020005 |
| 6 | HIWAY-STREET CONSTRUCTION | 1611 | 4 | 11020006 |
| 9 | HVY INDUSTRIAL CONSTRUCTION | 1629 | 29 | 11020007 |
| 10 | MECHANICAL CONTRACTORS | 1711 | 2 | 11020008 |
| 4 | MFRG-WHSE CONSTRUCTION | 1541 | 1 | 11020009 |
| 3 | MULTIPLE DWELLINGS | 1522 | 1 | 11020010 |
| 8 | PIPING/CONSTRUCTION | 1623 | 23 | 11020011 |
| 2 | RESIDENTIAL CONSTRUCTION | 1521 | 16 | 11020012 |
| 53 | STEEL | 1791 | 9 | 10020013 |
| 51 | STONEWORK | 1741 | 1 | 11020014 |
| 125 | ELECTRICAL UTILITY | 4911 | 22 | 11030001 |
| 126 | GAS UTILITY | 4922 | 2 | 11030002 |
| 127 | SEWER-WASTE SYSTEMS | 4953 | 19 | 10030003 |
| 56 | TELEPHONE UTILITY | 4811 | 2 | 11030004 |
| 130 | DATA PROCESSING SERVICE | 7374 | 2 | 11040001 |
| 131 | MANAGEMENT CONSULTING | 7392 | 7 | 11040002 |
| 129 | PROGRAMMING SERVICE | 7372 | 11 | 11040003 |
| 128 | TEMP HELP SERVICE | 7362 | 11 | 11040004 |
| 153 | METAL FURNITURE | 2522 | 1 | 11050001 |
| 124 | TOYS, GAMES | 3944 | 9 | 11050002 |
| 151 | WOOD FURNITURE | 2521 | 1 | 11050003 |
| 15 | CANNING | 2030 | 0 | 12010001 |
| 14 | DAIRY PROCESSING | 2020 | 0 | 12010002 |
| 16 | GRAIN/CEREAL PRODUCTS & PROCESSES | 2041 | 20 | 12010003 |
| 12 | MEAT PACKING | 2011 | 0 | 12010004 |
| 13 | POULTRY PROCESSING | 2017 | 0 | 12010005 |
| 163 | CORRUGATED BOXES | 2653 | 4 | 12020001 |
| 155 | STRUCTURAL WOOD PRODUCTS | 2439 | 2 | 12020002 |
| 17 | WOOD MILLWORK | 2431 | 0 | 12020003 |
| 164 | WOOD PALLETS | 2448 | 0 | 12020004 |
| 55 | CERAMICS/SILICON | 3264 | 14 | 12030001 |
| 18 | CHEMICALS/PETROLEUM | 2899 | 78 | 12030002 |
| 157 | GLASS | 3211 | 3 | 12030003 |
| 19 | PLASTIC/RUBBER | 3079 | 85 | 12030004 |
| 25 | ALUMINUM | 3350 | 7 | 12040001 |
| 26 | BRASS/BRONZE/COPPER | 3362 | 1 | 12040002 |
| 27 | CASTINGS | 3369 | 20 | 12040003 |
| 22 | GRAY IRON FOUNDRIES | 3321 | 0 | 12040004 |
| 23 | MALLEABLE IRON FOUNDRIES | 3322 | 0 | 12040005 |

Appendix TABLE VIII-2-continued

| list Record # | DESCRIPT | CODE | CNT1 | MKY |
|---|---|---|---|---|
| 28 | METAL HEAT TREATING | 3398 | 0 | 12040006 |
| 20 | ROLLING MILLS | 3312 | 0 | 12040007 |
| 24 | STEEL FOUNDRIES | 3325 | 1 | 12040008 |
| 21 | STEEL PIPE/TUBING | 3317 | 2 | 12040009 |
| 37 | ARCHITECTURAL METALS | 3446 | 6 | 12050001 |
| 33 | FABRICATED STRUCTURAL METAL | 3441 | 13 | 12050002 |
| 39 | FORGINGS | 3462 | 0 | 12050003 |
| 30 | HANDSAW/BLADES | 3425 | 0 | 12050004 |
| 156 | MACHINED PARTS | 3451 | 33 | 12050005 |
| 29 | METAL CANS | 3411 | 1 | 12050006 |
| 54 | METAL COATING | 3479 | 5 | 12050007 |
| 34 | METAL DOORS | 3442 | 0 | 12050008 |
| 38 | METAL FASTENERS | 3452 | 0 | 12050009 |
| 40 | METAL STAMPINGS | 3469 | 9 | 12050010 |
| 31 | MISC. HARDWARE | 3429 | 0 | 12050011 |
| 32 | MISC. HEATING EQUIPMENT | 3433 | 1 | 12050012 |
| 42 | ORDNANCE-WEAPONS-MUNITIONS | 3489 | 59 | 12050013 |
| 41 | PLATING/FINISHING | 3471 | 19 | 12050014 |
| 36 | SHEET METAL | 3444 | 46 | 12050015 |
| 35 | STEEL PLATE/PRESSURE VESSELS | 3443 | 19 | 12050016 |
| 43 | STEEL SPRINGS | 3493 | 0 | 12050017 |
| 44 | VALVES/FITTINGS | 3494 | 7 | 12050018 |
| 46 | WIRE PRODUCTS | 3496 | 2 | 12050019 |
| 45 | WIRE SPRINGS | 3495 | 1 | 12050020 |
| 74 | BLOWERS/FANS | 3564 | 6 | 12060001 |
| 82 | BUSINESS MACHINES | 3579 | 18 | 12060002 |
| 84 | COMML LAUNDRY MACHINES | 3582 | 0 | 12060003 |
| 73 | COMPRESSORS/NOZZELS/SPRAY | 3563 | 8 | 12060004 |
| 80 | COMPUTERS/MICROPROCESSORS | 3573 | 333 | 12060005 |
| 50 | CONSTRUCTION EQUIPMENT | 3531 | 17 | 12060006 |
| 58 | CONVEYORS/MATERIAL HANDLING | 3535 | 41 | 12060007 |
| 63 | DIES/MOLDS/FIXTURES | 3544 | 48 | 12060008 |
| 158 | ELEVATORS | 3534 | 0 | 12060009 |
| 48 | FARM MACHINERY | 3523 | 14 | 12060010 |
| 65 | FOOD MACHINERY | 3551 | 22 | 12060011 |
| 49 | LAWN MAINTENANCE/SNOW REMOVAL EQUIP | 3524 | 6 | 12060012 |
| 76 | GEARS/DRIVES/REDUCERS | 3566 | 1 | 12060013 |
| 59 | HOIST. CRANES. MONORAILS | 3536 | 16 | 12060014 |
| 85 | INDUSTRIAL COMMLHVAC EQUIPMENT | 3585 | 22 | 12060015 |
| 75 | INDUSTRIAL PATTERNS | 3565 | 0 | 12060016 |
| 77 | INDUSTRIAL PROCESS FURNACES | 3567 | 4 | 12060017 |
| 86 | INDUSTRIAL SERVICE MACHINES | 3589 | 6 | 12060018 |
| 60 | INDUSTRIAL TRUCKS-STACKERS-LIFTS | 3537 | 3 | 12060019 |
| 47 | INTERNAL COMBUSTION ENGINES | 3519 | 7 | 12060020 |
| 61 | METAL CUTTING TOOLS | 3541 | 6 | 12060021 |
| 62 | METAL FORMING TOOLS | 3542 | 1 | 12060022 |
| 57 | MINING EQUIPMENT | 3532 | 1 | 12060023 |
| 78 | POWER TRANSMISSION ACCESSORIES | 3568 | 2 | 12060024 |
| 69 | PRINTING MACHINES | 3555 | 11 | 12060025 |
| 71 | PUMPS | 3561 | 14 | 12060026 |
| 72 | ROLLER/BALL BEARINGS | 3562 | 2 | 12060027 |
| 81 | SCALES/BALANCES | 3576 | 0 | 12060028 |
| 70 | SPECIAL MACHINES | 3559 | 51 | 12060029 |
| 66 | TEXTILE MACHINERY | 3552 | 0 | 12060030 |
| 64 | TOOL MEASURING DEVICES | 3545 | 3 | 12060031 |
| 79 | TYPEWRITERS/WORD PROCESSORS | 3572 | 9 | 12060032 |
| 83 | VENDING MACHINES | 3581 | 1 | 12060033 |
| 68 | WEB-PAPER MACHINES | 3554 | 14 | 12060034 |
| 160 | WELL SCREENS/DRILLING EQUIPMENT | 3533 | 2 | 12060035 |
| 67 | WOODWORKING MACHINERY | 3553 | 1 | 12060036 |
| 100 | BATTERIES | 3691 | 7 | 12070001 |
| 95 | COMML/LIGHTING FIXTURES | 3646 | 2 | 12070002 |
| 97 | COMMUNICATIONS/RF/RADAR | 3662 | 124 | 12070003 |
| 91 | CONSUMER APPLIANCES | 3631 | 39 | 12070004 |
| 90 | CONTROLS | 3622 | 102 | 12070005 |
| 92 | ELECTRICAL COMPONENTS | 3643 | 30 | 12070006 |
| 93 | ELECTRICAL ENCLOSURES | 3644 | 3 | 12070007 |
| 102 | ENGINE ELECTRICAL EQUIPMENT | 3694 | 8 | 12070008 |
| 88 | I.C. CIRCUIT HANDLERS/SWITCHGEAR | 3613 | 6 | 12070009 |
| 99 | MAGNETIC ELECTRONICS/PCB-PWB'S | 3679 | 275 | 12070010 |
| 101 | MEDICAL ELECTRONICS | 3693 | 58 | 12070011 |
| 89 | MOTOR/GENERATOR/TURBINES | 3621 | 51 | 12070012 |
| 94 | RESIDENTIAL LIGHTING FIXTURE | 3645 | 1 | 12070013 |
| 98 | SEMI-CONDUCTORS/I.C.'S | 3674 | 45 | 12070014 |
| 96 | TELEPHONE EQUIPMENT | 3661 | 25 | 12070015 |
| 87 | TRANSFORMERS/POWER SUPPLIES | 3612 | 54 | 12070016 |
| 107 | AIRCRAFT | 3724 | 51 | 12080001 |
| 108 | AIRCRAFT PARTS | 3728 | 6 | 12080002 |
| 103 | AUTOMOBILES | 3711 | 4 | 12080003 |
| 104 | BUS/TRUCKS | 3713 | 2 | 12080004 |

Appendix TABLE VIII-2-continued

| list Record # | DESCRIPT | CODE | CNT1 | MKY |
|---|---|---|---|---|
| 113 | MISC. VEHICLES | 3799 | 10 | 12080005 |
| 111 | MISSILE PROPULSION | 3764 | 3 | 12080006 |
| 112 | MISSILES/SPACECRAFT | 3769 | 30 | 12080007 |
| 110 | RAILROAD EQUIPMENT | 3743 | 10 | 12080008 |
| 109 | SHIPS | 3731 | 2 | 12080009 |
| 159 | TANKS/ARMORED/TRACKED VEHICLES | 3795 | 7 | 12080010 |
| 106 | TRUCK TRAILERS | 3715 | 0 | 12080011 |
| 105 | VEHICLE PARTS/ACCESSORIES | 3714 | 8 | 12080012 |
| 117 | AUTOMATIC TEST EQUIPMENT | 3825 | 108 | 12090001 |
| 114 | AVIONICS/TEST SYSTEMS | 3811 | 69 | 12090002 |
| 154 | COUNTING & FLOW METERS | 3824 | 1 | 12090003 |
| 121 | DENTAL EQUIPMENT | 3843 | 0 | 12090004 |
| 115 | ENVIRONMENTAL-HVAC CONTROLS | 3822 | 21 | 12090005 |
| 116 | INSTRUMENTATION | 3823 | 53 | 12090006 |
| 119 | MEDICAL INSTRUMENTS | 3841 | 17 | 12090007 |
| 118 | OPTICAL INSTRUMENTS | 3832 | 0 | 12090008 |
| 161 | OPTICS | 3851 | 7 | 12090009 |
| 120 | ORTHOPEDIC/SURGICAL APPLIANCES | 3842 | 5 | 12090010 |
| 122 | PHOTOGRAPHIC EQUIPMENT | 3861 | 33 | 12090011 |
| 123 | WATCHES/CLOCKS | 3873 | 2 | 12090012 |
| 168 | IN TO SOLVE EOF ERROR IN GENFM652 | ---- | 0 | 13000001 |

Appendix TABLE VIII-3

| list Record # | DESCRIPT | CODE | CNT1 | MKY |
|---|---|---|---|---|
| 181 | | | 13 | |
| 182 | | | 13 | |
| 183 | | 6666 | 1 | |
| 41 | ALL CAD | CC | 122 | 21000001 |
| 36 | ADAGE CAD | 45 | 0 | 21000002 |
| 39 | ALTOS (FRONTIER) CAD | 48 | 0 | 21000003 |
| 166 | ANVIL CAD | 74 | 0 | 21000004 |
| 25 | APOLLO CAD | 32 | 8 | 21000005 |
| 1 | APPLICON CAD | 01 | 2 | 21000006 |
| 186 | ARRIS CAD | 83 | 0 | 21000007 |
| 30 | AUTOCAD | 39 | 50 | 21000008 |
| 2 | AUTOTROL CAD | 02 | 2 | 21000009 |
| 31 | BELLCAD | 40 | 1 | 21000010 |
| 38 | BRUNING CAD | 47 | 0 | 21000011 |
| 144 | CADKEY | 56 | 3 | 21000012 |
| 29 | CADNETIX | 37 | 1 | 21000013 |
| 141 | CADVANCE | 52 | 2 | 21000014 |
| 27 | CALAY CAD | 34 | 2 | 21000015 |
| 159 | CALCOMP/ISICAD | 67 | 0 | 21000016 |
| 126 | CALMA ADVANCE CAD | 49 | 0 | 21000017 |
| 22 | CALMA DAL CAD | 27 | 1 | 21000018 |
| 21 | CALMA DDM CAD | 26 | 1 | 21000019 |
| 3 | CALMA GDS I CAD | 03 | 1 | 21000020 |
| 4 | CALMA GDS II CAD | 04 | 2 | 21000021 |
| 157 | CASE CAD | 65 | 0 | 21000022 |
| 149 | CD2000/DDN ANVIL CAD | 59 | 3 | 21000023 |
| 9 | COMPUTOOL/CAMAX CAD | 09 | 0 | 21000024 |
| 5 | CV CADDS I | 05 | 3 | 21000025 |
| 6 | CV CADDS II | 06 | 0 | 21000026 |
| 7 | CV CADDS III | 07 | 7 | 21000027 |
| 8 | CV CADDS IV | 08 | 7 | 21000028 |
| 20 | CV CADDS IV-X | 25 | 18 | 21000029 |
| 146 | CV CADDS 5-X | 58 | 0 | 21000030 |
| 156 | CV MEDUSA CAD | 64 | 0 | 21000031 |
| 37 | CV/PERSONAL DESIGNER | 46 | 1 | 21000032 |
| 35 | DAISY CAD | 44 | 1 | 22000001 |
| 170 | DASH CAD | 76 | 1 | 22000002 |
| 154 | DATACAD | 61 | 0 | 22000003 |
| 10 | DEC CAD | 10 | 0 | 22000004 |
| 158 | DESIGN AIDS CAD | 66 | 0 | 22000005 |
| 143 | DESIGNPRO CAD | 55 | 0 | 22000006 |
| 171 | DRAFIX CAD | 77 | 4 | 22000007 |
| 28 | EAS CAD | 36 | 0 | 22000008 |
| 140 | ECAD | 51 | 0 | 22000009 |
| 152 | EE DESIGNER CAD | 60 | 1 | 22000010 |
| 164 | GENERIC CAD | 71 | 3 | 22000011 |
| 162 | GEOMOD CAD | 69 | 0 | 22000012 |
| 11 | GERBER CAD | 11 | 0 | 22000013 |
| 12 | HEWLETT-PACKARD CAD | 13 | 2 | 22000014 |
| 13 | IBM CADAM | 14 | 5 | 22000015 |
| 18 | ICEM/DDN/CD2000 | 22 | 7 | 22000016 |
| 172 | IGI 2100 CAD | 78 | 0 | 22000017 |

Appendix TABLE VIII-3-continued

| list Record # | DESCRIPT | CODE | CNT1 | MKY |
|---|---|---|---|---|
| 145 | INFINITE GRAPHICS (IGI) CAD | 57 | 0 | 22000018 |
| 24 | INTERGRAPH CAD | 30 | 5 | 22000019 |
| 34 | MCAUTO UGII CAD | 43 | 4 | 22000020 |
| 14 | MCAUTO/UNIGRAPHICS CAD | 15 | 4 | 22000021 |
| 32 | MENTOR CAD | 41 | 3 | 22000022 |
| 155 | MGM (MACINTOSH) CAD | 63 | 2 | 22000023 |
| 161 | MINICAD | 68 | 0 | 22000024 |
| 176 | ORCAD CAD | 81 | 1 | 22000025 |
| 142 | PCAD | 54 | 2 | 22000026 |
| 127 | POINTLINE CAD | 50 | 0 | 22000027 |
| 26 | PRIME CAD | 33 | 0 | 22000028 |
| 174 | PRO CAD | 79 | 0 | 22000029 |
| 163 | PROVISION CAD | 70 | 0 | 22000030 |
| 15 | REDAC CAD | 17 | 5 | 22000031 |
| 169 | SCHEMA CAD | 75 | 3 | 22000032 |
| 19 | SCI-CARDS CAD | 24 | 0 | 22000033 |
| 165 | SUN CAD | 73 | 0 | 22000034 |
| 16 | TEKTRONIX CAD | 19 | 1 | 22000035 |
| 17 | TERAK CAD | 20 | 0 | 22000036 |
| 33 | TEXAS INSTRUMENTS CAD | 42 | 0 | 22000037 |
| 153 | VALID CAE/CAD | 62 | 0 | 22000038 |
| 23 | VERSACAD | 28 | 2 | 22000039 |
| 177 | ICES CAD | 82 | 1 | 22000040 |
| 112 | AUTOCAD SYSTEM OWNER | X1 | 7 | 23000001 |
| 113 | AUTOCAD 2.0 OWNER | X2 | 1 | 23000002 |
| 114 | AUTOCAD 2.15 OWNER | X3 | 1 | 23000003 |
| 115 | AUTOCAD 2.17 OWNER | X4 | 3 | 23000004 |
| 116 | AUTOCAD 2.18 OWNER | X5 | 1 | 23000005 |
| 117 | AUTOCAD 2.5 OWNER | X6 | 2 | 23000006 |
| 133 | AUTOCAD 2.52 OWNER | X7 | 5 | 23000007 |
| 139 | AUTOCAD 2.6 OWNER | X8 | 2 | 23000008 |
| 150 | AUTOCAD 2.62 OWNER | X9 | 1 | 23000009 |
| 167 | AUTOCAD V-9 OWNER | X0 | 1 | 23000010 |
| 134 | AUTOCAD TRAINING | XV | 10 | 23000011 |
| 135 | AUTOCAD 00-03 MONTHS | XW | 8 | 23000012 |
| 136 | AUTOCAD 03-12 MONTHS | XX | 4 | 23000013 |
| 137 | AUTOCAD >1 YEAR | XY | 8 | 23000014 |
| 138 | AUTOCAD EXPERT | XZ | 2 | 23000015 |
| 118 | IBM AT (COMP) OWNER | XA | 4 | 23000016 |
| 119 | IBM XT (COMP) OWNER | XT | 5 | 23000017 |
| 42 | CAE | CE | 6 | 24000001 |
| 44 | CAM | CM | 3 | 24000002 |
| 129 | CIM | CI | 0 | 24000003 |
| 46 | FINITE ELEMENT ANALYSIS | FE | 3 | 24000004 |
| 65 | 3M EXPERIENCE | K1 | 70 | 25000001 |
| 70 | AMHOIST/AMCLYDE EXPERIENCE | K6 | 15 | 25000002 |
| 69 | CDC EXPERIENCE | K5 | 207 | 25000003 |
| 73 | DONALDSON'S EXPERIENCE | KI | 13 | 25000004 |
| 74 | ELLERBE EXPERIENCE | KJ | 8 | 25000005 |
| 67 | FMC EXPERIENCE | K3 | 25 | 25000006 |
| 75 | GENERAL-MILLS EXPERIENCE | KK | 15 | 25000007 |
| 76 | GNB EXPERIENCE | KL | 7 | 25000008 |
| 66 | HONEYWELL EXPERIENCE | K2 | 126 | 25000009 |
| 72 | IBM EXPERIENCE | K9 | 12 | 25000010 |
| 78 | MEDTRONIC EXPERIENCE | KP | 17 | 25000011 |
| 77 | NSP EXPERIENCE | KN | 13 | 25000012 |
| 84 | NW BELL/AT & T EXPERIENCE | K0 | 5 | 25000013 |
| 79 | ONAN EXPERIENCE | KS | 18 | 25000014 |
| 81 | PILLSBURY EXPERIENCE | KV | 10 | 25000015 |
| 82 | ROSEMOUNT EXPERIENCE | KW | 14 | 25000016 |
| 71 | TECHPOWER EXPERIENCE | K7 | 82 | 25000017 |
| 83 | THERMO KING EXPERIENCE | KY | 5 | 25000018 |
| 80 | TORO EXPERIENCE | KT | 9 | 25000019 |
| 68 | UNISYS EXPERIENCE | K4 | 125 | 25000020 |
| 122 | 3M RETIREE | R1 | 0 | 25000021 |
| 125 | CDC RETIREE | R5 | 5 | 25000022 |
| 123 | HONEYWELL RETIREE | R2 | 11 | 25000023 |
| 121 | NW BELL/AT & T RETIREE | R0 | 0 | 25000024 |
| 124 | SPERRY RETIREE | R4 | 6 | 25000025 |
| 175 | NSP RETIREE | RN | 0 | 25000026 |
| 178 | KEY EMPLOYEE | KE | 5 | 25000027 |
| 40 | ARTIFICIAL INTELLIGENCE | AI | 7 | 26000001 |
| 128 | AUTOMATED ASSEMBLY | AA | 10 | 26000002 |
| 131 | BIPOLAR | BP | 2 | 26000003 |
| 43 | CALIBRATE | CL | 24 | 26000004 |
| 120 | CLEAN ROOM | CR | 6 | 26000005 |
| 45 | CPM | CP | 0 | 26000006 |
| 47 | GEOMETRIC TOLERANCING | GT | 20 | 26000007 |
| 48 | HEAT TRANSFER | HT | 10 | 26000008 |
| 49 | HYDRAULICS | HY | 26 | 26000009 |

Appendix TABLE VIII-3-continued

| list Record # | DESCRIPT | CODE | CNT1 | MKY |
|---|---|---|---|---|
| 50 | INFRA RED | IR | 4 | 26000010 |
| 132 | JIT | JT | 22 | 26000011 |
| 51 | LASER | LA | 12 | 26000012 |
| 52 | MIL STDS | MS | 144 | 26000013 |
| 53 | NC/CNC | NC | 13 | 26000014 |
| 64 | NUCLEAR | NU | 5 | 26000015 |
| 54 | OPTICS | OP | 6 | 26000016 |
| 57 | PERT | PR | 3 | 26000017 |
| 56 | PLC'S | PL | 17 | 26000018 |
| 55 | PROFESSIONAL ENGINEER | PE | 30 | 26000019 |
| 58 | ROBOTICS | RB | 16 | 26000020 |
| 59 | RUBYLITH | RY | 1 | 26000021 |
| 130 | SURFACE MOUNT | SM | 11 | 26000022 |
| 60 | THICK FILM | TK | 2 | 26000023 |
| 61 | THIN FILM | TN | 14 | 26000024 |
| 62 | VLSI | VL | 11 | 26000025 |
| 63 | WIRE WRAP | WW | 10 | 26000026 |
| 148 | EMI/EMC | EM | 7 | 26000027 |
| 151 | STATISTICAL PROCESS CONTROL | SP | 42 | 26000028 |
| 179 | UNDERWATER LAB | UL | 0 | 26000029 |
| 85 | ADA | QA | 18 | 27000001 |
| 86 | C LANGUAGE | QC | 61 | 27000002 |
| 109 | COMPUTER GRAPHICS | QG | 6 | 27000003 |
| 87 | FORTRAN | QF | 92 | 27000004 |
| 88 | LISP | QL | 16 | 27000005 |
| 89 | PASCAL | QP | 76 | 27000006 |
| 110 | REAL-TIME | QR | 23 | 27000007 |
| 91 | SIMULATION-MODELING | QS | 20 | 27000008 |
| 92 | TACTICS-MISSION | QT | 2 | 27000009 |
| 90 | UNIX | QU | 38 | 27000010 |
| 160 | COMPACT II | CT | 0 | 27000011 |
| 168 | FORTH | QO | 6 | 27000012 |
| 184 | DBASE | QD | 0 | 27000013 |
| 185 | NETWORKING | NE | 1 | 27000014 |
| 94 | 4-BIT | ZB | 1 | 28000001 |
| 93 | ANAYK | ZA | 2 | 28000002 |
| 103 | ANUYK | ZU | 4 | 28000003 |
| 95 | CDC COMPUTERS | ZC | 36 | 28000004 |
| 96 | DEC COMPUTERS | ZD | 38 | 28000005 |
| 97 | HEWLETT-PACKARD COMPUTERS | ZH | 11 | 28000006 |
| 98 | IBM COMPUTERS | ZI | 44 | 28000007 |
| 99 | IBM PC-XT-AT | ZJ | 60 | 28000008 |
| 104 | INTEL CHIPS | ZV | 54 | 28000009 |
| 105 | INTEL 8080 | ZW | 14 | 28000010 |
| 106 | INTEL 8085 | ZX | 18 | 28000011 |
| 107 | INTEL 8086 | ZY | 17 | 28000012 |
| 108 | INTEL 8088 | ZZ | 9 | 28000013 |
| 147 | MACINTOSH COMPUTER | ZK | 13 | 28000014 |
| 111 | MOTOROLA | ZL | 39 | 28000015 |
| 100 | MOTOROLA 6800 | ZM | 11 | 28000016 |
| 101 | MOTOROLA 68000 | ZN | 14 | 28000017 |
| 102 | SPERRY-UNIVAC COMPUTERS | ZS | 27 | 28000018 |
| 180 | ANALOG | AN | 29 | 28000019 |
| 173 | USE TO FIX EOF ERROR IN GENFM682 | -- | 0 | 30000001 |

1. A method of selecting none or more candidates from a database of candidates wherein the database of candidates includes a list of candidates and their respective qualifications, the method comprising the steps of:
   a. creating a requirement record comprising
      i. a first plurality of files including fields of information required for contacting a customer;
      ii. a customer code file which includes a predefined list of certain company names;
      iii. a job criteria file having fields for recording customer selections of job criteria from a predefined list of selection criteria wherein the list of selection criteria is presented in English;
   b. if the customer is listed in the customer code file, then creating a database of all candidates having experience with the customer;
   c. if the customer is not listed in the customer code file, then retaining the contact information;
   d. selecting any one of a one or more main types of qualifications;
   e. displaying logically progressively more restrictive qualification selections in response to the selected one of the one or more main types of qualifications;
   f. selecting any one of the logically progressively more restrictive qualifications and repeating steps e and f until displaying a final menu screen showing a plurality of logically progressively most restrictive qualifications;
   g. showing on the final menu screen a quantity of candidates available for each of the plurality of logically progressively most restrictive qualifications so as to allow prediction of an outcome of the number of selected candidates;
   h. repeating steps d through g for selecting none or more other main types of qualifications;
   i. processing customer selections resulting in an alphabetical display showing candidate names, coded education, length of total experience, and billing rates in a matrix format and indicating by asterisks candidates having customer selected qualifications and reserving a column in the matrix to indicate past experience with the customer;

j. optionally performing any one or all of the steps of:
   i. broadening qualification selections to increase the quantity of selected candidates;
   ii. tightening the qualification selections to decrease the quantity of selected candidates;
   iii. changing qualification selections;
   iv. viewing resumes of selected candidates;
   v. deleting a selected candidate from the display; and k. creating a record of the displayed matrix.

2. The method of claim 1 further comprising a reverse match process comprising the steps of:
   a. storing the plurality of most restrictive qualifications displayed in step 56.f as a set of finally selected qualifications;
   b. adding or deleting none or more candidates and the none or more candidates' qualifications to or from the list of candidates to generate a current list of candidates; and
   c. comparing the current list of candidates' qualifications against the finally selected qualifications.

3. The method of claim 1 further comprising a follow-up match process comprising the steps of:
   a. storing the selections of most restrictive qualifications made in steps 56.d through 56.g;
   b. adding at least one new candidate and the at least one new candidates's qualifications to the list of candidates;
   c. comparing the at least one new candidate's qualifications against the stored selections;
   d. determining if the at least one new candidate's qualifications match the stored selections of most restrictive qualifications; and
   e. if the at least one new candidate's qualifications are determined to match the stored selections of most restrictive qualifications, creating an updated record of the displayed matrix including the at least one new candidate's name, coded education, length or total experience, and billing rates.

* * * * *

UNITED STATES PATENT AND TRADEMARK OFFICE
CERTIFICATE OF CORRECTION

PATENT NO. : 5,164,897

DATED : November 17, 1992

INVENTOR(S) : Neil M. Clark, et al

It is certified that error appears in the above-identified patent and that said Letters Patent is hereby corrected as shown below:

Column 4, Line 20, add a --.-- after the word "files".

Column 4, Line 67, delete the word "employee".

Column 7, Line 60, the word "use" should be --user--.

Column 16, Line 59, the word "ma" should be --may--.

Column 23, Item # 217, the word "EXECUTIVE" should be --EXCHANGE--.

Column 23, Item # 227, the word "OFCICE" should be --OFFICE--.

Column 27, Item # 85, there should be a space between the letters "COMML" and "HVAC".

Signed and Sealed this

Twenty-first Day of December, 1993

*Attest:*

BRUCE LEHMAN

*Attesting Officer*     *Commissioner of Patents and Trademarks*